United States Patent [19]

Zenner et al.

[11] Patent Number: 5,096,724
[45] Date of Patent: Mar. 17, 1992

[54] METHODS, COMPOSITIONS, AND SYSTEMS FOR LIGAND EXTRACTION

[75] Inventors: Bruce Zenner, Hercules; Emory De Castro, Emeryville; Joseph P. Ciccone, Davis, all of Calif.

[73] Assignee: Aquanautics Corporation, Alameda, Calif.

[21] Appl. No.: 317,172

[22] Filed: Feb. 28, 1989

Related U.S. Application Data

[63] Continuation-in-part of Ser. No. 202,747, Jun. 3, 1988, abandoned.

[51] Int. Cl.$^5$ ............................................. B65D 85/00
[52] U.S. Cl. ...................................... 426/124; 206/0.7
[58] Field of Search .................. 426/124, 398; 206/0.7

[56] References Cited

U.S. PATENT DOCUMENTS

| | | | |
|---|---|---|---|
| 2,217,850 | 10/1940 | Warne et al. | 23/221 |
| 2,450,276 | 9/1948 | Fogier et al. | 23/221 |
| 3,230,045 | 1/1966 | Miller | 23/221 |
| 3,586,514 | 6/1971 | Vijlbrief | 99/171 |
| 4,092,391 | 5/1978 | Valyi | 264/97 |
| 4,165,972 | 8/1979 | Iles et al. | 55/28 |
| 4,287,995 | 9/1981 | Moriya | 215/228 |
| 4,343,715 | 8/1982 | Bonaventura et al. | 252/186 |
| 4,421,235 | 12/1983 | Moriya | 206/524.2 |
| 4,427,416 | 1/1984 | Bonaventura et al. | 23/293 R |
| 4,442,297 | 4/1984 | Hill et al. | 549/206 |
| 4,451,270 | 5/1984 | Roman | 55/38 |
| 4,475,994 | 10/1984 | Gagne et al. | 204/129 |
| 4,514,522 | 4/1985 | Sievers et al. | 521/53 |
| 4,536,409 | 8/1985 | Farrell et al. | 426/398 |
| 4,542,010 | 9/1985 | Roman et al. | 423/579 |
| 4,579,223 | 4/1986 | Otsuka et al. | 206/204 |
| 4,602,987 | 7/1986 | Bonaventura et al. | 204/129 |
| 4,609,383 | 9/1986 | Bonaventura et al. | 55/16 |
| 4,629,544 | 12/1986 | Bonaventura et al. | 204/131 |
| 4,667,814 | 5/1987 | Wakamatsu et al. | 206/0.7 |
| 4,702,966 | 10/1987 | Farrell et al. | 428/500 |
| 4,756,436 | 7/1988 | Morita et al. | 215/228 |
| 4,766,229 | 8/1988 | Kobayashi et al. | 556/138 |
| 4,840,280 | 6/1989 | Schvester | 426/118 |

FOREIGN PATENT DOCUMENTS

| | | |
|---|---|---|
| 0083826 | 1/1982 | European Pat. Off. . |
| 0142903 | 11/1984 | European Pat. Off. . |
| 62-122569 | 6/1987 | Japan . |

OTHER PUBLICATIONS

Roessel, (1988), "Milieufactor belangrijk in verpakkingsbeleid", pp. 22-25; Missets Pakblad; 10.

Rice; "Oxygen Eliminators Concepts Under Development Evoke Intriguing Product Protection possibilities"; Food Processing; 1988; 49.

Bonaventura et al.; "Anionic Control of Function in Vertebrate Hemoglobins"; Symposium on Respiratory Pigments, 20, J. Am. Zool., 20:7, (1980).

Business Week, Jun. 27, 1988, pp. 90-91.

Wolpert, (1987), Paper Film and Foil Converter, 61:64-66.

Packaging (USA), Jun. 1988, p. 83.

Food Processing (Chicago), 1988, 49:58-59.

(List continued on next page.)

Primary Examiner—John Niebling
Assistant Examiner—Kathryn Gorgos
Attorney, Agent, or Firm—Townsend and Townsend

[57] ABSTRACT

Compositions of matter according to the present invention comprise a carrier compound immobilized in or on a solid phase. The carrier compound is reactive to bind a ligand such as molecular oxygen and includes a complex formed from a transition metal ion and a multidentate organic chelate. The solid phase is substantially immiscible in or separated from a ligand-containing environment, and the compositions are utilized by contacting the immobilized carrier compounds with the ligand-containing environment. Desirably, the compositions may be maintained in an inactive state (i.e., unable to bind ligand) where the transition metal ion is separated from the chelate. By allowing the complex to form at a preselected time, premature ligand binding can be avoided.

12 Claims, 14 Drawing Sheets

OTHER PUBLICATIONS

Gitzel et al., Polymer, 27:1781, (1986).
Wohrle et al., Makromol. Chem., 187:2081, (1986).
Shigehara et al., Macromolecules, 14:1153, (1981).
Nishide et al., Macromolecules, 19:494, (1986).
Nishide et al., Macromolecules, 20:417, (1987).
Nishide et al., Macromolecules, 20:1913, (1987).
Nishide et al., Macromolecules, 20:2312, (1987).
Timmons et al., Inorg. Chem., 18:2977, (1979).
Harris et al., Inorg. Chem., 19:21, (1980).
Timmons et al., Inorg. Chem., 21:1525, (1982).
Wang in *Oxygenases*, Hayaishi, ed., 502–511, (1962), Academic Press, New York.
Ledon et al., J. of Organometallic Chem., 165:C25, (1979).
Brinigar et al., J. Am. Chem. Soc., 96:5597, (1974).
Simmons et al., J. Chem. Soc. Dalton Trans., 1827, (1980).
Neiderhoffer et al., Chem. Rev., 84:137–203, (1984).
Harris et al., Inorg. Chem., 17:889, (1978).
Timmons et al., Inorg. Chem., 17:2192, (1978).
Timmons et al., Inorg. Chem., 18:1042, (1979).
Brault et al., Biochemistry, 13:4591, (1974).
Castro, Bioinorganic Chemistry, 4:45–65, (1974).
Chang et al., J. Am. Chem. Soc., 95:5810, (1973).
Crumbliss et al., Science, 164:1168–1170, (1969).
Crumbliss et al., J. Am. Chem. Soc., 92:55, (1970).
Dufour et al., J. Mol. Catalysis, 7:277, (1980).
Roessel, (1988), Misset's Pakblad, 10:42–46.

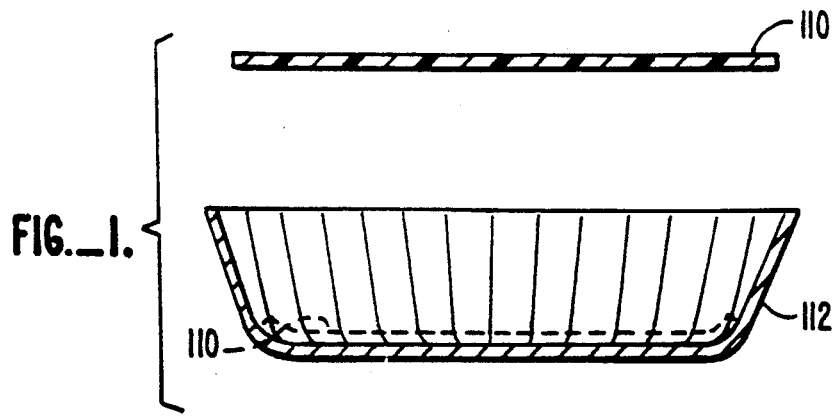
FIG._1.
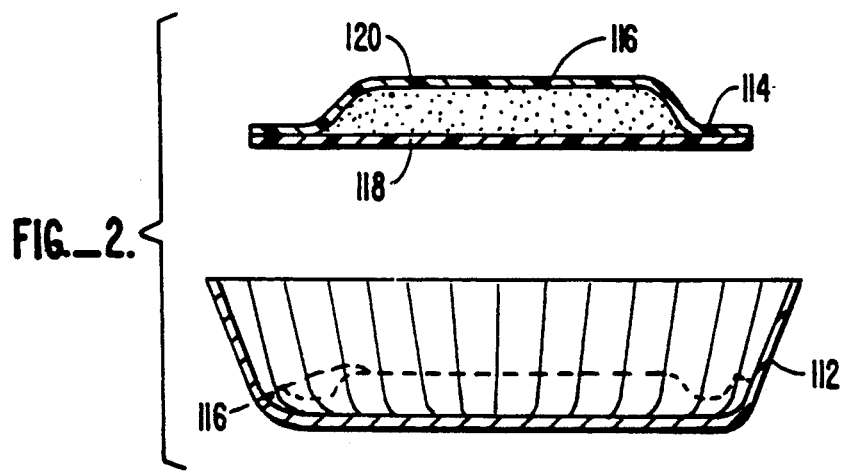
FIG._2.
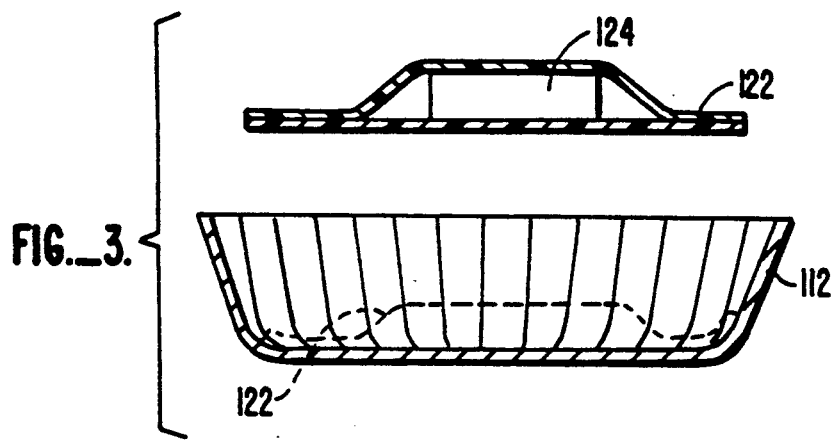
FIG._3.

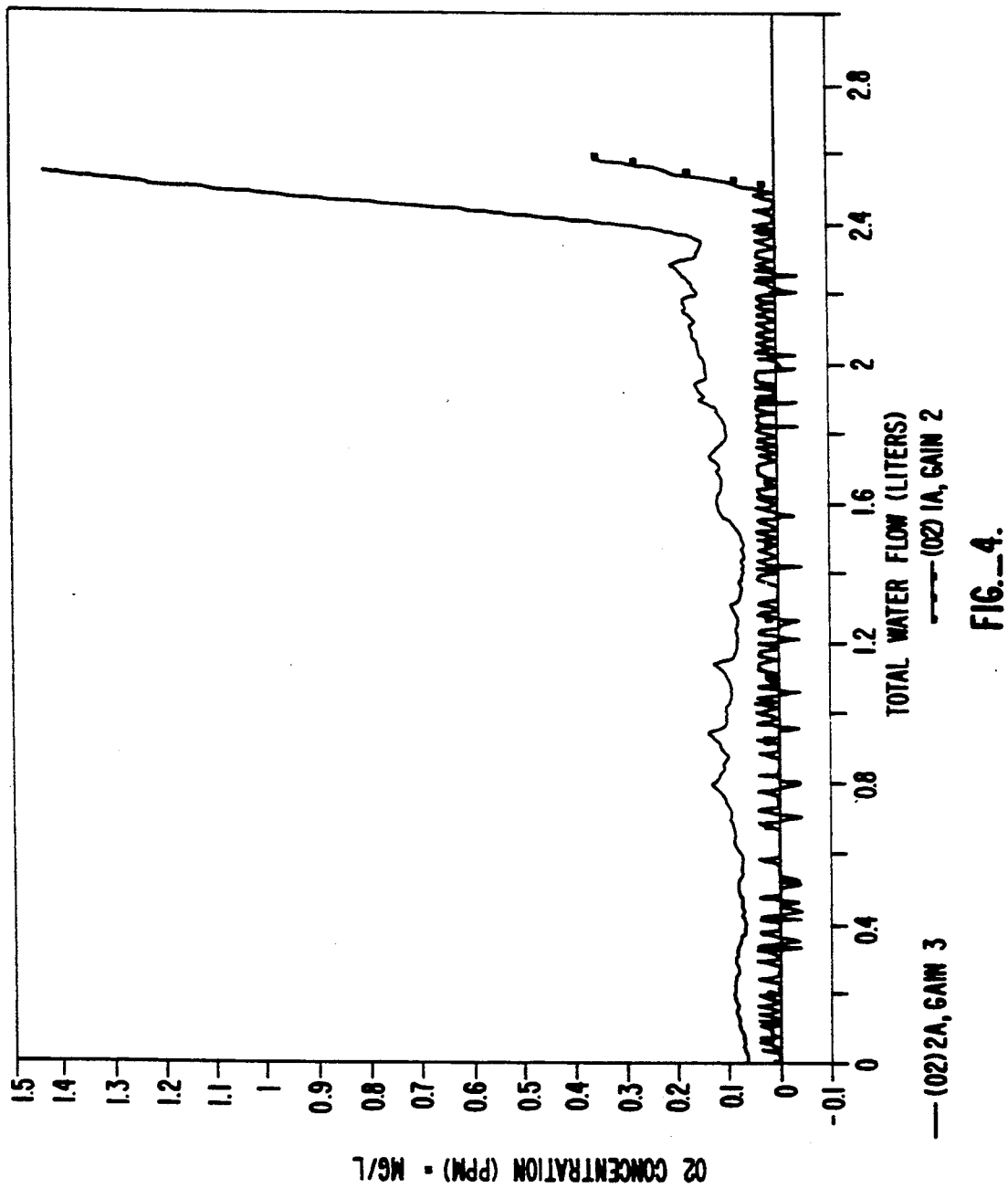
FIG._4.

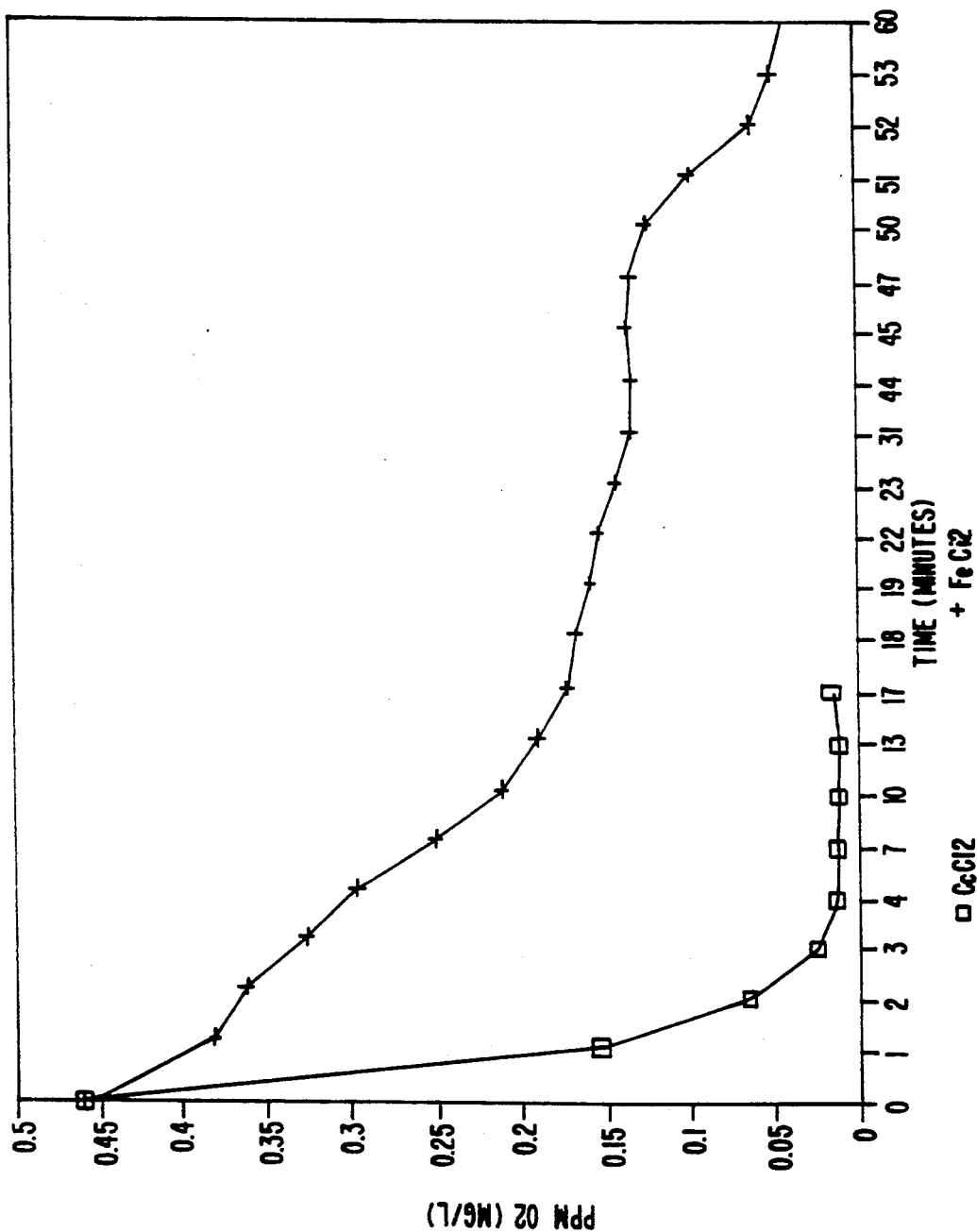
FIG._5.

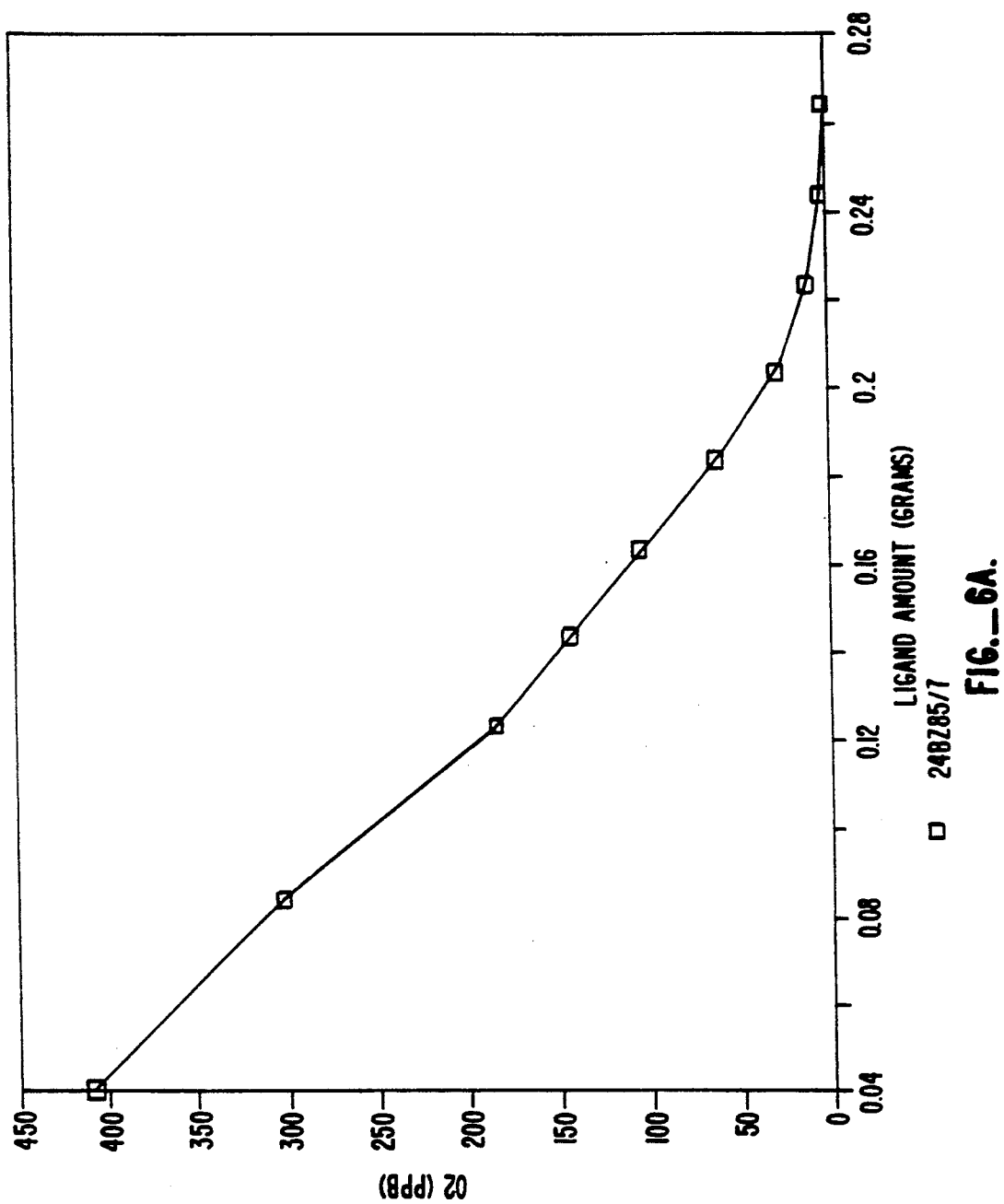
FIG._6A.

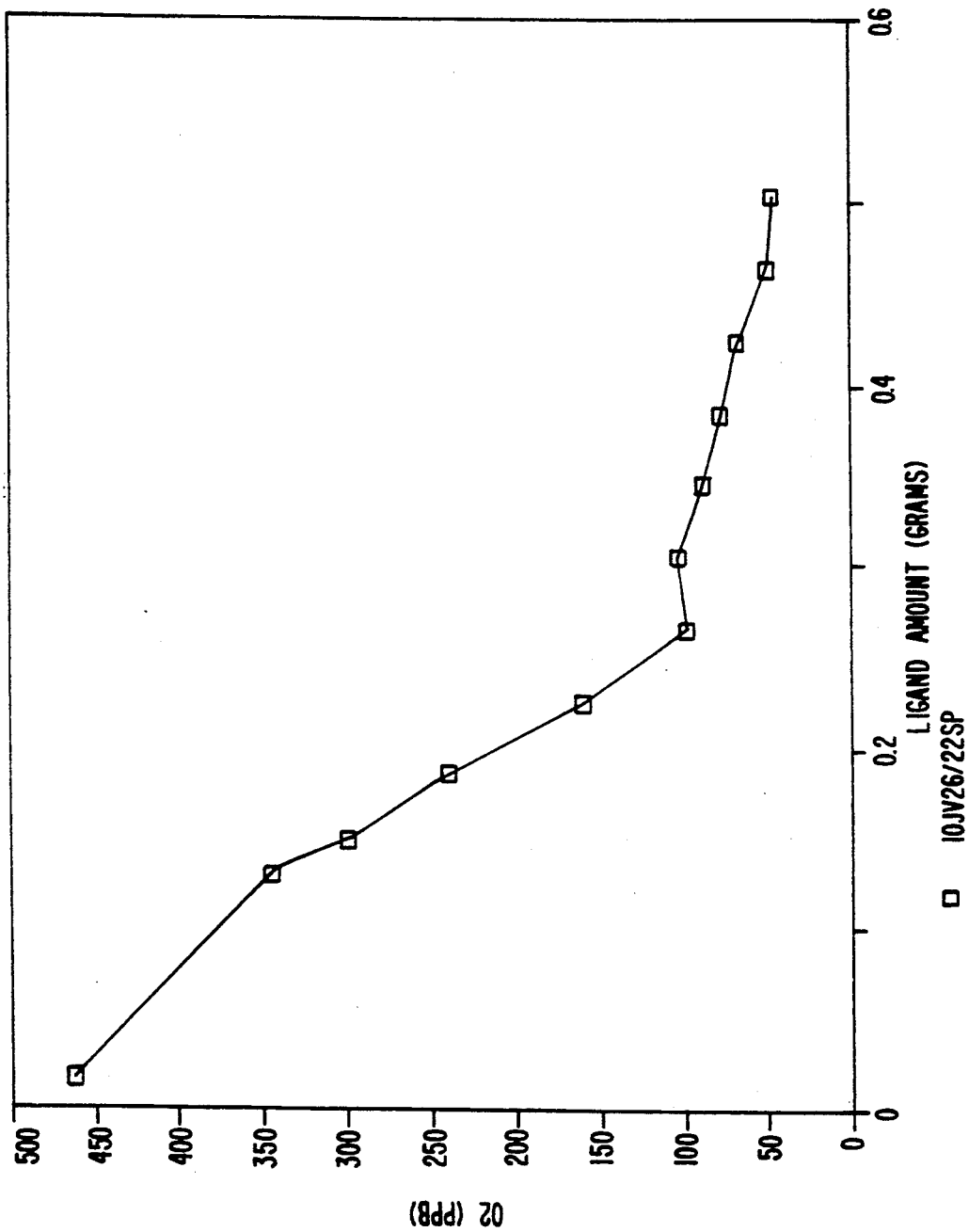
FIG._6B.

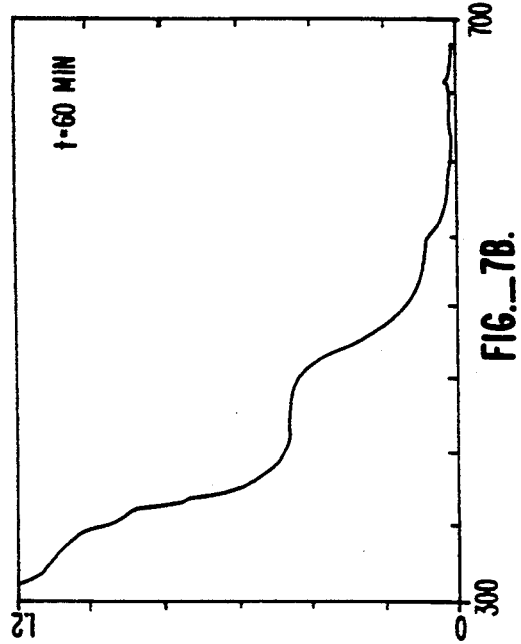
FIG._7A.
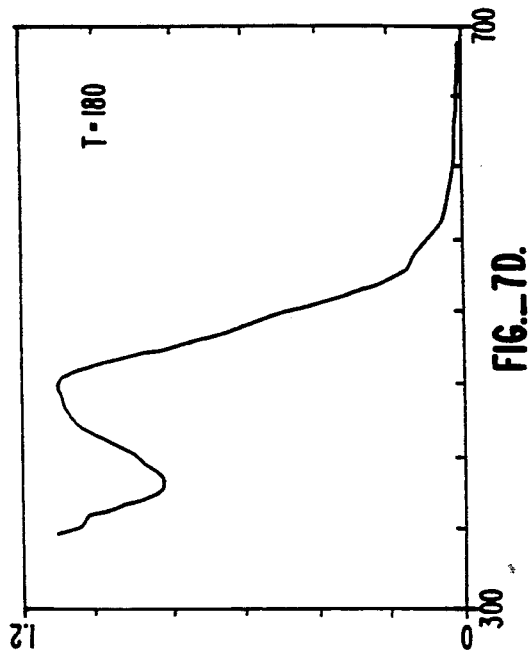
FIG._7B.
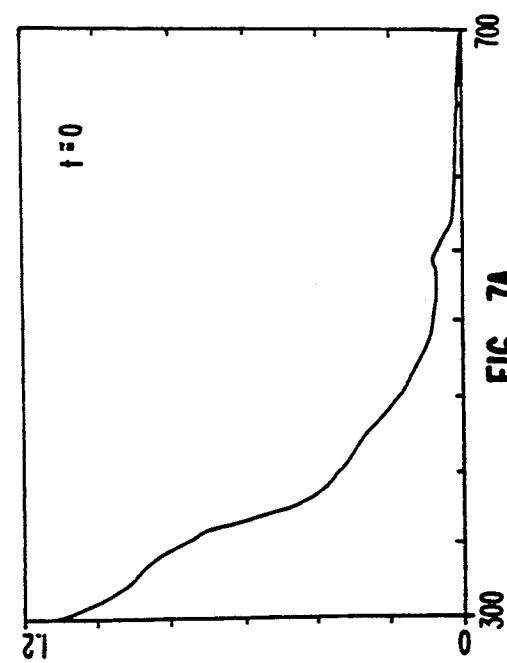
FIG._7C.
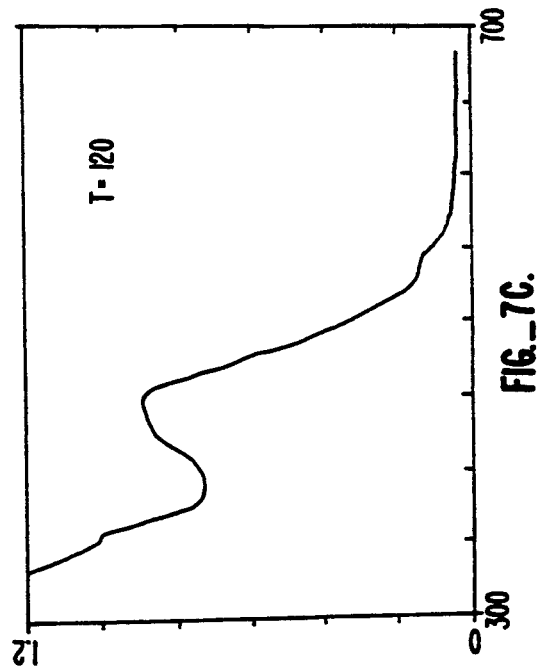
FIG._7D.

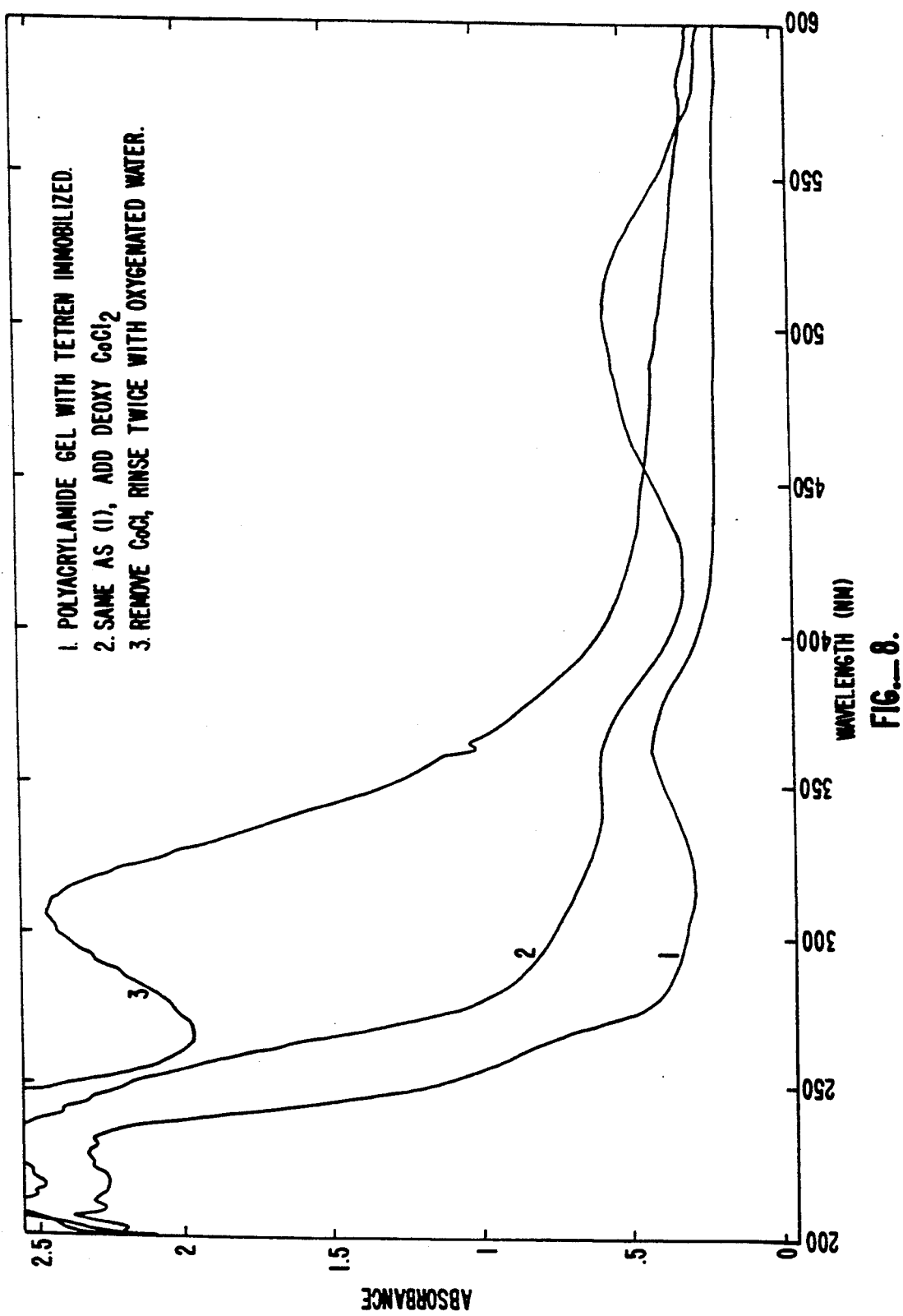
FIG._8.

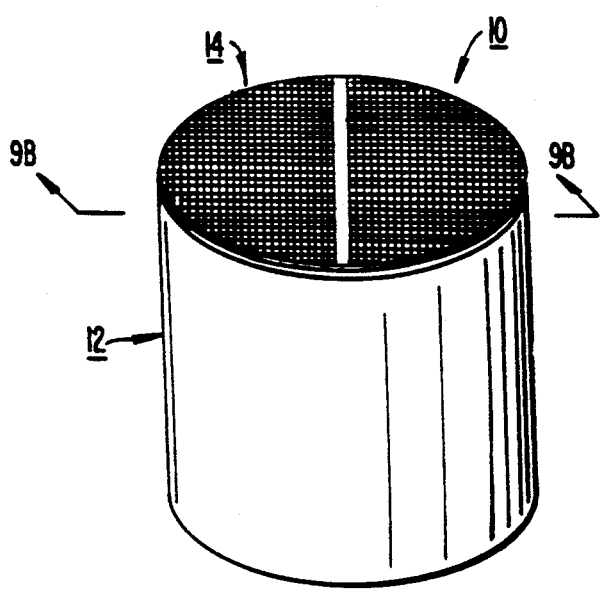
FIG._9A.
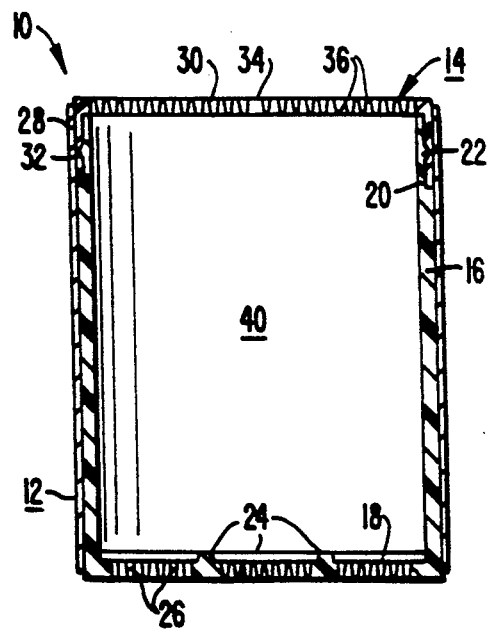
FIG._9B.

METHODS, COMPOSITIONS, AND SYSTEMS FOR LIGAND EXTRACTION

This application is a continuation-in-part of application Ser. No. 07/202,747, filed on June 3, 1988, now abandoned, the disclosure of which is incorporated herein by reference.

BACKGROUND OF THE INVENTION

1. Field of the Invention

The present invention relates to the extraction of a small ligand such as molecular oxygen from a ligand-containing environment by the utilization of carrier compounds immobilized on a solid phase.

2. Description of the Relevant Art

Oxidative damage to beverages, foods and edible oils is a well-documented problem. See, Richardson et al., ed., Chemical Changes in Food During Processing, 1985, AVI Publishing Company, Westport, Conn. The principal effects of this damage are on proteins, edible oils, and fats, although carbohydrates are also affected. Unsaturated fats contain double bonds which undergo free radical reactions in the presence of oxygen, with the concomitant formation of lipid hydroperoxides. These hydroperoxide products are themselves highly reactive species which can in turn react with carbohydrates and proteins present in the food product, forming complex polymeric products. These degradation products adversely affect color, flavor and nutritional value of the products in which they occur. In some cases, these degradation products may be toxic or carcinogenic.

Prior to the present invention, several methods for controlling oxygen in food products and packages have been developed. However, each of these has shortcomings. Vacuum packing and gas sparging are expensive processes which remove oxygen but also expel the volatile oils which contribute to many of the desirable flavors and odors of a product. Hot-fill packaging reduces the level of oxygen present in food but can also accelerate the oxidation reaction itself, thereby exacerbating the problem. Antioxidant food additives such as ascorbic acid, tocopherol (vitamin E) and BHA have demonstrated effectiveness to reduce oxygen. However, they can only be added safely in limited quantities and they defeat the effort to deliver foods naturally.

Of more pertinence to the present invention, various forms of oxygen-absorbing materials have been incorporated into food and other product packaging to lower residual oxygen levels after a package has been sealed. See, for example, U.S. Pat. No. 4,756,436, which discloses the use of an iron powder absorbent incorporated in a bottle cap; U.S. Pat. Nos. 4,421,235 and 4,287,995, which disclose bottle caps and packets which contain various oxygen absorbers, such as copper amine complexes; and U.S. Pat. Nos. 4,667,814; 4,579,223; 4,092,391; 3,586,514; Japanese Patent No. 62122569; and European Patent No. 142903, which disclose other forms of oxygen absorbent packaging. Oxygen absorbent packaging is also disclosed in various literature references, including Roessel (1988) Misset's Pakblad 10:42–46; Wolpert (1987) Paper Film and Foil Converter 61:64–66; Packaging (USA) June 1988, p. 83; Food Processing (Chicago) 49:58–59 (1988); Business Week, June 27, 1988, pp. 90–91; and Food Packaging (1988) 49:22. The latter four references refer to the use of Longlife TM in food packaging. Longlife TM is the tradename for oxygen absorbers according to the present invention.

The use of oxygen-absorbent materials in food packaging has been limited by the tendency of such materials to prematurely bind oxygen, i.e., prior to their incorporation in the packaging. To avoid such premature oxygen-binding, it is necessary to either perform packaging operations in an oxygen-free environment, prevent oxygen exposure in some other way (e.g., store and manipulate the materials under a protective barrier), or drive-off bound oxygen after the material is incorporated in the packaging and before the package is sealed. Each of the approaches significantly complicates the packaging operation and is therefore undesirable. It would thus be desirable to utilize oxygen absorbent compositions which would be substantially incapable of binding oxygen during the packaging operation but be activatable after the package is sealed. This would allow packaging operations to be performed in an oxygen-containing environment without loss of activity by the absorbent.

U.S. Pat. Nos. 4,536,409 and 4,702,966, and European Patent Application No. 83826, disclose an activatable oxygen-absorbing system which employs potassium sulfite as the absorbent. Potassium sulfite is able to bind oxygen only when wet. The packaging system employs a gas-permeable membrane which is water-permeable only at elevated temperatures. Thus, the absorbent may be activated by simultaneous exposure to heat and water. Although functional, this system suffers from certain limitations. For example, the system is not suitable for heat-labile products which cannot be exposed to elevated temperatures. Additionally, the potassium sulfite can adversely affect the flavor and odor of a packaged food product.

For these reasons, it would be desirable to provide alternate oxygen-absorbing compositions, systems, and methods. Such compositions should have a high oxygen-binding capacity, should be compatible with most or all comestibles and other oxygen-sensitive products, should be usable in environments containing other gases (such as carbon dioxide), should be usable in wet and dry environments, and should be economic to employ. In particular, the oxygen-absorbing systems and methods should provide for selective activation of the absorbent composition, including activation without the use of heat.

A variety of naturally-occurring metalloproteins, including hemoglobin, myoglobin, hemocyanin, and hemerythrin, are capable of reversibly binding oxygen and transporting oxygen from a permeable membrane to a site within an organism at which the oxygen is needed. In hemoglobin, for example, oxygen is reversibly bound to ferrous [Fe(II)] porphyrins incorporated in the protein. Oxidized, ferric hemoglobins are unreactive to molecular oxygen. The properties of hemoglobins, hemerythrins, and hemocyanins have been the subjects of numerous studies, as documented in, e.g., Bonaventura, et al., Symposium on Respiratory Pigments, 20 J. Am. Zool. 20:7 (1980) and 20:131 (1980).

The oxygen binding capabilities of such metalloproteins have been utilized to extract oxygen from air and other fluids. Miller, U.S. Pat. No. 3,230,045 discloses the use of an oxygen binding chromoprotein such as hemoglobin to separate oxygen from other gases. The chromoproteins are kept moist or in solution and are absorbed on or bound to filter paper. An electrolyte such as sodium chloride may also be present. The filter paper is alternately exposed to air (the carrier absorbs oxygen) and vacuum, which removes the bound oxygen. Bonaventura et al., U.S. Pats. No. 4,427,416, and 4,343,715, also use naturally-occurring oxygen carriers to extract oxygen from fluids. The metalloproteins are insolubilized at high concentrations by entrapment and/or covalent linkage to a polyurethane matrix or similar, flexible support in states that are capable of reversibly binding oxygen. The material disclosed in these patents, generally known as "hemosponge" since it usually incorporates hemoglobin or another heme-type protein, is capable of extracting oxygen from various fluid environments. However, the rate of extraction is less than that which may be desired for many applications which involve a high rate of oxygen use. Further, these disclosures utilize chemical regeneration of the oxidized carrier compounds, with, e.g., ferricyanide solutions, which, in applications which require large amounts of oxygen, present considerable supply and waste disposal problems. Release of bound oxygen from the "hemosponges" requires either chemical oxidation of the carrier compound with the concomitant supply and waste disposal problems or various methods for pressing the hemosponge, which require pumps, vacuums, and the like which use substantial quantities of energy.

A variety of transition metal complexes with mono-, bi-, and multi-dentate chelates are also capable of reversibly binding oxygen. Such artificial oxygen carriers and their properties in solutions have been described by a number of researchers. For example, Brault, et al., Biochemistry 13:4591 (1974), discloses the preparation and properties of ferrous deutero- and tetraphenylporphyrins in various organic solvents. Castro, Bioinorganic Chemistry 4:45-65 (1974), discloses the synthesis of hexa- and penta-coordinate iron porphyrins, which are models for the prosthetic groups of active sites of certain cytochromes and other heme proteins. Other iron-containing transition metal compounds which may reversibly bind oxygen are described by Chang, et al., J. Am. Chem. Soc. 95:5810 (1973).

Numerous cobalt, manganese, and copper compounds also exhibit reversible oxygen binding. For example, Crumbliss, et al., Science 164:1168–1170 (1969) disclose Schiff base complexes of Co(II) which form stable complexes with oxygen species in solution. See also: Crumbliss, et al. J. Am. Chem. Soc. 92:55 (1970) (monomeric cobalt complexes of oxygen); Dufour, et al., J. Mol. Catalysis 7:277 (1980) (Catalysis of oxidation of simple alkyl-substituted indoles by Co(II), Co(III), and Mn(III) meso-tetraphenyl porphyrins via a ternary porphyrin-indole-oxygen complex); Brinigar, et al., J. Am. Chem. Soc. 96:5597 (1974) (effect of solvent polarity on reversible oxygenation of several heme complexes prepared by reduction with sodium dithionite or a mixture of palladium black and calcium hydride); Hill, U.S. Pat. No. 4,442,297 (absorption of gases using manganese compounds); Simmons, et al., J. Chem. Soc. Dalton Trans. 1827 (1980) (reversible coordination of oxygen to copper / (I) complexes of imidazole derivatives).

A variety of devices and methods utilizing such synthetic transition metal oxygen-carrier compounds have been devised for extraction of oxygen from air. For example, Warne, et al., U.S. Pat. No. 2,217,850, disclose the reaction of oxygen in air with solids of cobaltous hexamine salts to synthesize, on a large scale, peroxocobalt amine solids, followed by removal of the solution, and separate chemical regeneration of the oxygen and the starting cobalt hexamine salts. Fogler, et al., U.S. Pat. No. 2,450,276 utilize a solid cobaltous compound of a tetradentate Schiff base ligand to extract oxygen from air by alternately cooling a bed of the solid carrier compound, which absorbs oxygen from the air, and heating the oxygenated carrier compound to release bound oxygen. This process is accompanied by severe decomposition of the carrier compound. Iles, et al., U.S. Pat. No. 4,165,972 discloses an apparatus for alternately heating and cooling alternate beds of carrier compound to absorb oxygen from air into cooled beds of carrier and expel oxygen into a second gas handling system by heating the bed of carrier compound.

Roman, U.S. Pat. No. 4,542,010, discloses a method for producing oxygen and nitrogen using a porous, hydrophilic membrane support containing a solution of a transition metal oxygen carrier in a non-aqueous solvent. This device serves as a facilitated diffusion membrane. Oxygen bound to the carrier diffuses from a first permeable membrane contacting air to a second membrane where the oxygen is released from the carrier. Thus, the permeability of oxygen through the membrane is increased by the reversible binding of oxygen to the organometallic carrier compound. Loading and unloading of oxygen from the liquid membrane is accomplished by a combination of temperature and/or pressure differentials. One drawback to this process is that oxygen generated using this device is costly, since the temperature and/or pressure differentials required to load and unload the oxygen carriers require large energy inputs. In addition, both sides of the membranes must remain saturated with solvent in order for the membrane to function, significantly adding to the cost and complexity of the device.

It is now well understood that many such transition metal-based carriers typically have a lower valence state, i.e., Mn(II), Fe(II), Co(II) or Cu(I) in which the carrier is capable of reversibly binding molecular oxygen under appropriate conditions; and a higher valence (more oxidized) state, e.g., Mn(III), Fe(III), Co(III), or Cu(II), in which binding of molecular oxygen is essentially absent. Most of the known methods for extracting oxygen from air using such transition metal carrier compounds are dependant upon the carrier compound remaining in the lower valence state. Molecular oxygen is absorbed from sources with a relatively high concentration (and hence chemical activity) of oxygen and reversibly bound to the carrier compound. The oxygen desorbs when the carrier compound is exposed to an environment in which the chemical activity of oxygen is lower, e.g., low oxygen partial pressures or elevated temperatures. Extraction processes may be carried out by exposing the carrier compounds to alternating environments of higher and lower oxygen activity, e.g., alternating partial pressure of oxygen or alternately low and high temperatures. The carrier compound may actually be used to carry oxygen from the feedstock environment to the delivery environment by diffusion or by pumped circulation.

Some types of artificial transition metal carrier complexes have been used in or suggested for use in devices for extraction, absorption, and generation of oxygen from fluid media. For example, Roman, U.S. Pat. Nos. 4,451,270 and 4,452,010, discloses Schiff base complexes of metals in an oxygen selective, permeable membrane and extraction system. The carriers include cobalt complexes of linear and macrocyclic tetradentate, linear pentadentate, and bidentate Schiff base chelates in primarily non-aqueous, Lewis base solvents. Hill, U.S. Pat. No. 4,442,297, uses phosphine complexes of Mn(II) in dehydrated solvents to purify nitrogen gas by extracting impurities including molecular oxygen. Sievers, U.S. Pat. No. 4,514,522, discloses oxygen sorbents comprising linear, tetradentate ketoamine complexes bound to porous polymers. Gagne, U.S. Pat. No. 4,475,994, uses cobalt complexes of unknown stoichiometry in a mixed solvent at high pH to transport electrochemically generated superoxide ions across a fluid membrane. Bonaventura et al., U.S. Pats. Nos. 4,602,383; 4,609,987; and 4,629,544, disclose a variety of metalloporphyrins, in combination with Lewis bases, in aqueous, non-aqueous, and water-immiscible solvents and their use to electrochemically separate oxygen from fluids.

Oxygen carrier compounds, including cobalt complexes of some linear, pentadentate polyamines, and their properties have been extensively reviewed and tabulated. Niederhoffer, et al., Chem. Rev. 84:137–203 (1984). More detailed investigations of cobalt complexes of some linear, pentadentate polyamines have been reported in a series of articles by Harris, et al., and Timmons, et al.: Harris, et al., Inorg. Chem. 17:889 (1978); Timmons, et al., Inorg. Chem. 17:2192 (1978); Timmons, et al., Inorg. Chem. 18:1042 (1979); Timmons et al., Inorg. Chem. 18:2977 (1979); Harris, et al., Inorg. Chem. 19:21 (1980); and Timmons, et al., Inorg. Chem. 21:1525 (1982). The use of transition metal complexes of polyalkylamines in electrochemical or other oxygen extraction and generation processes is disclosed in co-pending, commonly assigned U.S. patent application Ser. No. 018,891, filed Feb. 25, 1987.

Incorporation of oxygen carriers into polymeric matrices has been achieved by several workers in the field. Wang (in Oxygenases, Hayaishi, ed., 502–511, 1962, Academic Press, New York) has described incorporation of heme into a polystyrene matrix. This complex was demonstrated to be functional in reversible oxygen binding. Subsequently, immobilization of heme and synthetic heme analogs has been carried out on polystyrene, vinyl copolymers, polymethacrylate, polyvinylpyrrolidone and dextran. See, Ledon, et al., J. of Organometallic Chem. 165:C25 (1979); Gitzel, et al., Polymer 27:1781 (1986); Wohrle, et al., Chem. 187:2081 (1986); Shigehara, et al., Macromolecules 14:1153 (1981); Nishide, et al., Macromolecules 19:494 (1986), Macromolecules 20:417 (1987), Macromolecules 20:1913 (1987), and Macromolecules 20:2312 (1987c).

SUMMARY OF THE INVENTION

Compositions for the extraction of a small ligand such as molecular oxygen from a ligand-containing environment comprise a ligand carrier compound immobilized on (or in) a solid phase. The carrier compounds are contacted with the ligand-containing environment, either directly or through a suitable membrane, in order to extract the ligand therefrom. The carrier compound comprises a transition metal complex including a transition metal ion and a multidentate organic chelate. The solid phase is substantially immiscible in or separated from the ligand-containing environment and may be in the form of discrete particles, sheets, membranes, gels, and the like, where the organic chelate is covalently attached or non-covalently adsorbed to the solid phase. Alternatively, the carrier compound may be physically retained within a solid phase comprising a ligand-permeable membrane without attachment at the molecular level. The multidentate organic chelate will be selected from the group consisting of porphyrins and derivatives, linear, branched, or cyclic polyalkylamines, phthalocyanines and derivatives, crown ethers, macrocyclic amines and lacunates, acetylacetonates, and Schiff bases such as salicylidene amidates and salicylidene amines, with polyalkylamines being preferred. Suitable transition metal ions include titanium, manganese, chromium, iron, cobalt, nickel, copper, ruthenium, rhodium, palladium, osmium, iridium, vanadium, and platinum.

The oxygen-absorbing compositions of the present invention are particularly suitable for selective activation when incorporated in packaging systems. The multidentate organic chelates are unable to bind oxygen (or other ligands) when they are not complexed with the transition metal ion. Thus, the compositions of the present invention may be initially formed with the transition metal ion segregated from the organic chelate in some way. Conveniently, the organic chelate may be mixed with the transition metal in the form of a transition metal salt. So long as the mixture is maintained in a dry state (e.g., relative humidity below about 50%), the transition metal will be unable to combine with the organic chelate and the composition will remain inactive. By exposing the composition to sufficient moisture, however, the transition metal and the organic chelate will be able to combine to activate the composition. Alternatively, the transition metal may be encapsulated, typically in the form of an aqueous salt solution, and mixed with the organic chelate. The composition may then be activated by rupturing the encapsulation. In some cases, the transition metal may be naturally present in the ligand-containing environment. In that case, it may only be necessary to expose the organic chelate to the ligand-containing environment to effect ligand absorption.

The compositions of the present invention may be incorporated in a variety of packaging configurations. Typically, the immobilized carrier compounds (in either active or inactive form) will be retained behind or within a gas permeable membrane. The membrane is incorporated within the packaging and able to absorb oxygen (or other ligand) after sealing the package against oxygen penetration. The membrane may be in the form of a discrete packet which may be placed or secured within a larger package. The membrane may alternatively be incorporated into the package, such as within a package closure, e.g., a bottle cap. In either case, the ligand will pass from the interior of the package through the membrane to the absorbent, where it will be captured.

The compositions of the present invention may also be directly introduced to a ligand-containing environment without a membrane for separation. In that case, the solid phase will generally facilitate subsequent separation of the compositions from the environment (if desired).

DESCRIPTION OF THE FIGURES

FIGS. 1–3 illustrate exemplary bottle cap closures constructed in accordance with the principles of the present invention.

FIG. 4 shows the oxygen removal from aerated water after flowing through a packed column of immobilized $Co^{++}$/tetraethylenepentamine on silica.

FIG. 5 shows deoxygenation of a stirred mixture of aerated water with either $Fe^{++}$/tetraethylenepentamine or $Co^{++}$/tetraethylenepentamine on silica.

FIG. 6 shows the relationship of oxygen removal to the amount of immobilized chelate/silica present and compares the oxygen-removing activities of silica/tetraethylene-pentamine (FIG. 6A) versus silica/1,9-bis(2-pyridyl)-2,5,8-triazanonane (FIG. 6B).

FIG. 7 shows the spectra of oxygen uptake by poly[acrylic acid]/1,11-bis(2-pyridyl)-2,6,10-triazaundecane complexed with $Co^{++}$. FIG. 7A was taken before addition of oxygenated $CoCl_2$. FIGS. 7B, 7C and 7D show the subsequent oxygen absorption at 60, 120 and 180 minutes, respectively.

FIG. 8 shows the spectra of oxygen uptake by polyacrylamide/tetraethylenepentamine complexed with $Co^{++}$. Spectra 1 was taken of the polyacrylamide/tetren complex alone. Spectra 2 was taken after addition of deoxygenated $CoCl_2$. Spectra 3 was taken following removal of unbound $CoCl_2$ and rinsing (2×) with oxygenated water.

FIG. 9 shows one type of an enclosed system as described in U.S. Pat. 4,093,105, which is suitable for containing the solid phase of the invention. FIG. 9A is a perspective view of the container. FIG. 9B is a sectional view taken along line 2-2 of FIG. 9A.

DETAILED DESCRIPTION OF SPECIFIC EMBODIMENTS

Figure 10:
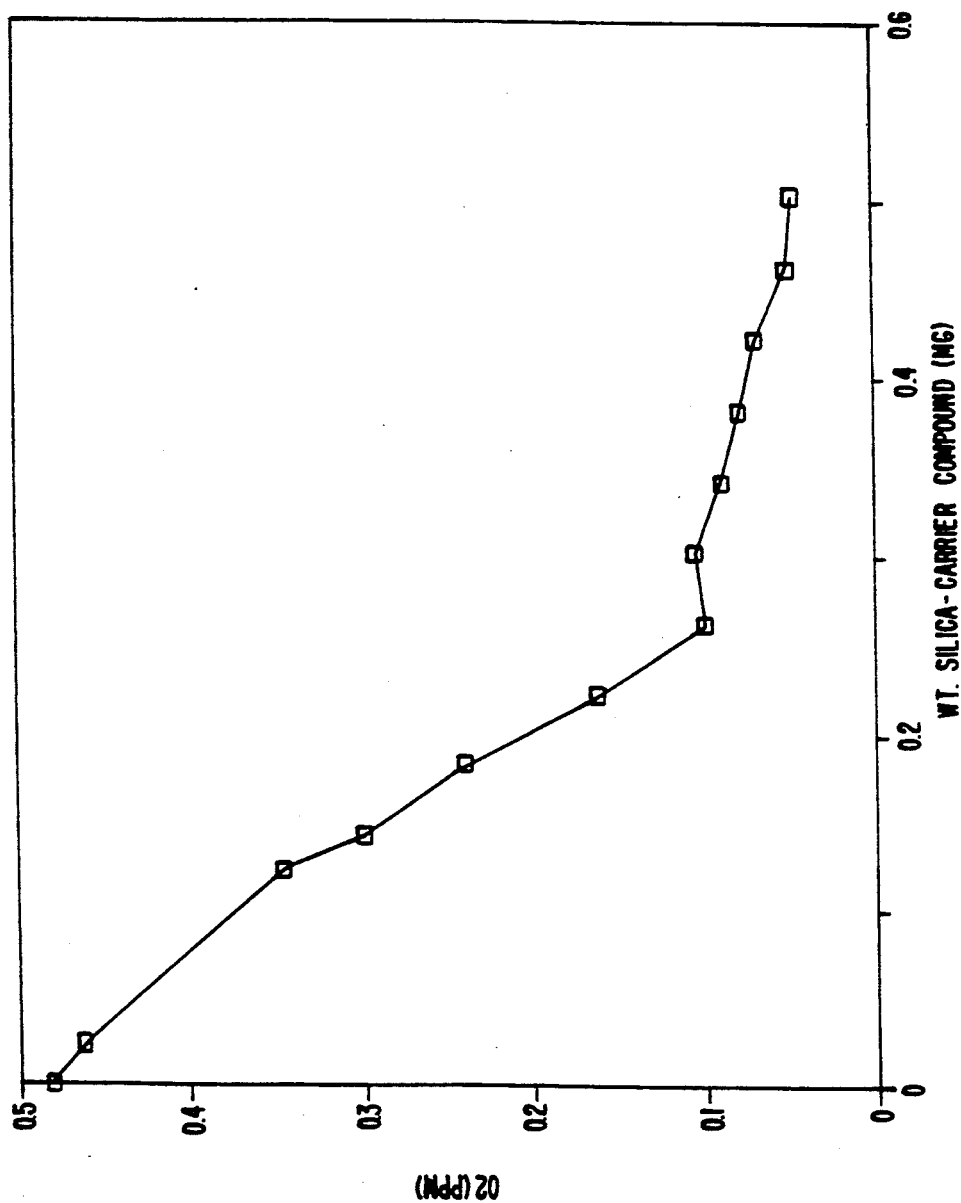
FIG. 10 is a graph illustrating oxygen absorption from water as a function of amount of silica-immobilized carrier compound.

Carrier compounds suitable in the practice of the present invention broadly include complexes which are reactive to bind a ligand of interest, e.g., oxygen, under the particular conditions of use contemplated. More particularly, the carrier compound will be a transition metal complex which includes a transition metal ion and a multidentate organic chelate, which complex is capable of binding ligand in a ligand-containing environment.

The term "ligands" refers to small molecules such as oxygen, carbon monoxide, carbon dioxide, nitric oxide, cyanide, isocyanide, hydroxide, and the like. The present invention is preferably utilized for oxygen binding and absorption, and reference will frequently be made to "oxygen carriers" and "oxygen binding compounds." It will be understood that the invention is intended to comprehend extraction (from an appropriate medium) of such other ligands as well as oxygen.

The term "ligand-containing environment" refers to a fluid medium which includes one or more ligands, as defined above.

The transition metal complexes may be coordination complexes of any of a variety of transition metals including titanium, manganese, chromium, iron, cobalt, nickel, copper, ruthenium, rhodium, palladium, osmium, iridium, vanadium, zinc, and platinum. For oxygen binding, the transition metal will usually be manganese, iron, or cobalt, but the invention is not so limited. Other transition metals that form complexes that bind molecular oxygen may also be used. The primary requisites of the transition metal are that it form complexes and have a first valence state in which the transition metal complex binds molecular oxygen (or other desired ligand). Often, the transition metal will also have a second valence state in which the transition metal complex is substantially inert to binding molecular oxygen. In known transition metal complexes which will be suitable for use, the valence state in which oxygen is reversibly bound will be lower (more reduced), e.g., Mn(II), Fe(II), Co(II) or Cu(I); the non-binding valence state will generally be higher and achieved via a one electron oxidation of the lower valence state, e.g., Mn(III), Fe(III), Co(III), or Cu(II).

Transition metal complexes known to be suitable for use in compositions according to the invention can be formed from a variety of multidentate (multicoordinate) organic chelates, especially tetradentate and pentadentate chelates, but also including tridentate and hexadentate chelates. Multidentate organic chelates may be macrocyclic, branched or linear. Suitable multidentate chelates for complexation with a transition metal may include, but are not limited to, porphyrins; porphyrin derivatives; linear, cyclic, and macrocyclic polyalkylamines; phthalocyanines and their derivatives; crown ethers; macrocyclic amines and lacunates; and Schiff base chelates, such as acetylacetonates, salicylidene amidates, and salicylidene amines. Porphyrin chelates which may be used in the carrier compounds include naturally-occurring porphyrins, such as protoporphyrins, deuteroporphyrins, etioporphyrins, mesoporphyrins, and protoporphyrins, and synthetic porphyrins, such as tetraphenyl porphyrins and octaethyl porphyrins.

In addition to the multidentate organic chelates just described, the carrier compounds of the present invention may further comprise various monodentate, bidentate, and tridentate chelates including nitrogenous bases such as ammonia; primary, secondary, and tertiary amines; amino acids and their derivatives; diamines such as ethylene- and propylene-diamine; heterocyclic amines such as imidazoles, pyrroles, pyridines, bipyridyls and indoles; oxygen-containing liquids such as water, alcohols, furans, and dioxanes; sulfur-containing moieties such as thiophenes, thiobenzenes, and mercaptans; phosphorus derivatives; halides and pseudohalides including chloride, bromide, iodide, cyanate, thiocyanate, cyanide, and thiocyanide; and other small molecules such as carbon monoxide.

The monodentate, bidentate, and tridentate chelates will normally be combined with other chelating molecules in order to form multidentate carrier compounds suitable for use in the present invention. Thus, not all ligating molecules in the multidentate structure need to be covalently bound to one another. Examples of carrier compounds comprising a tetradentate molecule combined with a monodentate molecule include hemoglobin where the tetradente heme molecule combines with the monodentate imidazole molecule (present in histidine) to coordinate with iron. Similarly, Wang (1962), supra., describes an immobilized heme molecule combined with a monodentate imidazole molecule which together coordinate with iron. Cobalt pentaamine is a well known synthetic oxygen binding complex where individual (monodentate) ammonia molecules are coordinated with the cobalt molecule. Combinations of bidentate and tridentate ligating molecules may also find use in forming the preferred pentadentate chelates of the present invention.

Polyalkylamines are one class of multidentate chelates which may be used in the present invention. Useful polyalkylamines are generally linear and pentadentate, and at least four of the atoms available for coordination to the selected transition metal ion (generally referred to herein as "ligating atoms") will be nitrogen. The remaining ligating atom, usually the third or central ligating atom, will usually be nitrogen or oxygen, although it may alternatively be a sulfur or phosphorus atom. The ligating nitrogens may be of the primary aliphatic, secondary aliphatic, tertiary aliphatic, or aromatic type, and more than one type of nitrogen may be present in the same polyalkylamine. Ligating oxygen, when present, will usually be of the ether type, while ligating sulfur will be a thioether.

Polyalkylamines useful in the present invention will include those of the general formula:

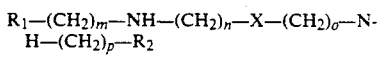

where X may be 2,6-pyridyl; 2,6-piperidyl; 2,5-pyrrolyl; 2,4-imidazolyl; substituted heterocyclic amines; —O—; —S—; >P—$R_3$; and >N—$R_3$—Y where $R_3$ is hydrogen, lower alkyl, aryl, aralkyl, or alkylene, and when $R_3$ is alkylene, Y is vinyl, halo, carboxyl, carbonyl, amino, epoxide, or acid chloride; m, n, o, and p may each be equal to 1, 2, 3, or 4; $R_1$ and $R_2$ are each an organic group having a nitrogen atom of the primary aliphatic, secondary aliphatic, tertiary aliphatic, heterocyclic, or heteraromatic type which is also available for coordination to a transition metal ion. $R_1$ and $R_2$ may, in any particular polyalkylamine, be the same or different. In addition, the alkyl chains interconnecting the ligating atoms may themselves be branched or substituted with, e.g., short chain alkyl groups such as methyl, ethyl, n- or s- propyl, or n-, s- or t- butyl, or with relatively small heterogroups such as acetyl, methyl acetyl, hydroxymethyl, hydroxyethyl, halomethyl, or haloethyl, where "halo" denotes F, Cl, Br, or I.

Representative examples of specific polyalkylamine compounds are described and their synthesis discussed in co-pending, commonly assigned U.S. patent application Ser. No. 018,891, filed Feb. 25, 1987, the disclosure of which is incorporated herein by reference.

A particular class of useful polyalkylamines will have the general formula:

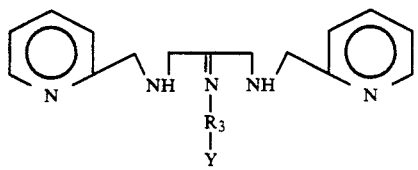

where $R_3$ is lower alkylene, preferably being ethylene, propylene, or butylene, and Y is a chemically reactive functionality, such as amino, vinyl, halo, carboxyl, acid chloride, and the like.

A second class of multidentate organic chelates useful to form the transition metal carrier compounds of the present invention comprises macrocyclic amines, including tetradentate, pentadentate, and hexadentate. The macrocyclic amine chelates useful in the present invention will include those of the general formulas:

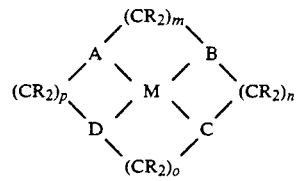

and;

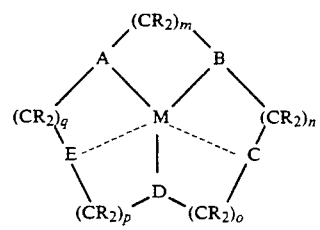

and;

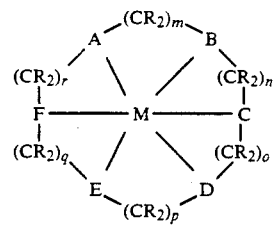

where:
A, B, C, D, E, and F are each independently nitrogen, oxygen, sulfur, or phosphorous;
m, n, o, p, q, and r are each typically 2, 3, 4, 5 or 6, more usually 2 or 3; and
the R substituents are each independently generally H or short chain (linear or branched) alkyl, although $R_2$ may represent ketyl (=O); and
at least one but usually three, and more usually four, of the atoms available for coordination (A, B, C, D, and/or E) to the selected transition metal ion (generally referred to herein as "ligating atoms") will be nitrogen. The remaining ligating atom(s) will usually be nitrogen, oxygen, sulfur or phosphorus. Ligating nitrogens may be of the secondary or tertiary aliphatic, usually NH, or aromatic type, such as pyridyl, imidazolyl, or pyrrolyl; one or more such types of nitrogen may generally be present in the same macrocyclic amine chelate. Ligating oxygen, when present in a particular chelate, will usually be of the ether type, while ligating sulfur will be a thioether.

Usually, the R groups will all be hydrogen, but alkyl-substituted chains connecting the ligating atoms may be preferred in some instances; the steric effects of such side chains may desirably alter the function and/or performance of carrier compounds in processes according to the invention.

Representative examples of specific macrocyclic amine chelating compounds are described and their synthesis discussed in co-pending, commonly assigned U.S. patent application Ser. No. 07/191,519, filed May 9, 1988, which is incorporated herein by reference.

Naturally occurring oxygen-binding substances such as hemoglobin, myoglobin, hemerythrin, and hemocyanin may be successfully used in a solid state oxygen extractor according to the invention. However, their use is generally not preferred due to decomposition that would be encountered when such metalloproteins are isolated in the solid state.

Transition metal ions which may be used in the carrier compounds of the present invention are those which will form complexes, have a first valence state in which the transition metal complex binds molecular oxygen or another ligand of interest, and have a second valence state in which the transition metal complex has a substantially lower affinity toward molecular oxygen or other ligand. Such transition metals may be chosen from titanium, manganese, chromium, iron, cobalt, nickel, copper, ruthenium, rhodium, palladium, osmium, iridium, vanadium, zinc, and platinum. For oxygen absorption, the transition metal will usually be manganese, iron, or cobalt, more usually cobalt, but the invention is not so limited.

Particularly suitable ligand carrier compounds are metallic complexes of pentadentate polyalkylamines of the following general formula

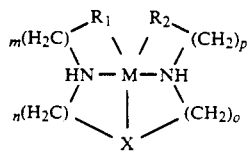

where X may be 2,6-pyridyl, 2,6-piperidyl, 2,5-pyrrolyl, 2,4-imidazolyl, substituted heterocyclic amines, —O—, —S—, P—, and N—$R_3$ where $R_3$ is hydrogen, lower alkyl, or aralkyl; m, n, o, and p may each be equal to 1, 2, 3, or 4; $R_1$ and $R_2$ are each an organic group having a nitrogen atom of the primary aliphatic, secondary aliphatic, tertiary aliphatic, heterocyclic, or heteroaromatic type which is also available for coordination to a transition metal ion. $R_1$ and $R_2$ may, in any particular polyalkylamine, be the same or different. In addition, the alkyl chains interconnecting the ligating atoms may themselves be branched or substituted with, e.g., short chain alkyl groups such as methyl, ethyl, n- or s-propyl, or n-, s- or t- butyl, or with relatively small heterogroups such as acetyl, methyl acetyl, hydroxymethyl, hydroxyethyl, halomethyl, or haloethyl, where "halo" denotes F, Cl, Br, or I. M is an ion of a metal selected from titanium, manganese, chromium, iron, cobalt, nickel, copper, ruthenium, rhodium, palladium, osmium, iridium, and platinum; preferably, M will be manganese, iron, or cobalt; most preferably, M will be cobalt.

Metallic complexes of polyalkylamines of the above formula are disclosed and their synthesis described in co-pending and commonly assigned U.S. patent application Ser. No. 018,891, filed Feb. 25, 1987, which is incorporated herein by reference.

The charge on the carrier compound will depend on the valence state of the metal ion, the extent of ionization of the chelate, the pH of the carrier solution, etc. Sufficient counterions will accompany carrier compounds (whether as solids or in solution) to counterbalance this charge. The counterions will usually be anions and will be both chemically and electrochemically unreactive under the conditions to be employed for extraction, transport, or regeneration of molecular oxygen. Counteranions will typically be small, unreactive anions such as: halide ions, e.g., fluoride chloride, bromide, or iodide; oxyganions, e.g., nitrate, sulfate, or phosphate; or organic ions, e.g., acetate or citrate.

Additional suitable carrier compounds according to the present invention will be metallic complexes having the general formula:

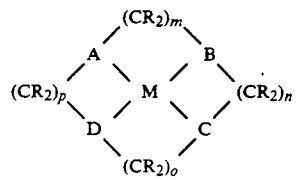

and:

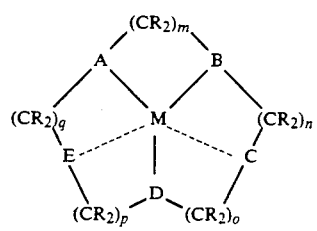

and:

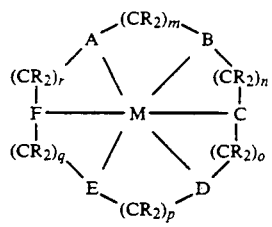

where;

A, B, C, D, E, and F are each nitrogen, oxygen, sulfur, or phosphorus;

m, n, o, p, q and r are each typically 2, 3, 4, 5 or 6;

the R substituents are each generally H or short chain (linear or branched) alkyl, although $R_2$ may represent ketyl (=O); and M is a suitable transition metal ion.

Metallic complexes of macrocyclic amines of the above formulae are disclosed and their synthesis described in co-pending and commonly assigned U.S. patent application Ser. No. 07/191,519, filed May 9, 1988, which is incorporated herein by reference.

Other ligand carrier compounds are known in the art or may be prepared by procedures known in the art.

To bind a ligand, the transition metal ion in the carrier compound must be in an oxidation state in which the carrier compound is capable of binding oxygen, usually its lower (more reduced) valence state [Fe(II), Mn(II), Co(II), or Cu(I), for example]. Oxidation of the transition metal to a higher valence state produces a non-functional oxygen carrier which can then be removed from the ligand-containing environment, if desired, or the non-functional carrier and/or oxygenated carrier may be reactivated by releasing the bound oxygen by the addition of heat, the application of vacuum, electrochemical means, chemical oxidation/reduction, or demetallation followed by remetallation.

Reactivation by demetallation/remetallation may be accomplished, for example, by protonating the nonfunctional immobilized carrier compound by treatment with a mild acid (e.g., 1-2M HCl). This causes the chelate to release the transition metal along with the bound oxygen. The acid/metal solution is then removed and the immobilized chelate may be deprotonated by dilute sodium hydroxide or potassium hydroxide rinse, followed by the readdition of a metal ion to reactivate the carrier.

Alternatively, the transition metal may be removed from the non-functional carrier compound by use of a metal chelator such as EDTA to strip the transition metal ion, usually a divalent cation, from the immobilized chelate, followed by a water rinse. The metal-free immobilized multidentate organic chelate may then be used as described for acid generation.

Many oxygen carrier compounds are capable of reversible electrochemical oxidation and reduction reactions. When the functional carrier is oxidized, it will release the bound oxygen. Subsequent re-reduction will reactivate the carrier for reuse. Such oxidation/reduction reactions can also be carried out with the appropriate chemical oxidants and reductants.

The solid phase of the present invention may be in the form of particulates, beads, powders, sheets, films, gels, and the like, and may be selected from the group of materials consisting of aluminas, silicas, diatomaceous earth, zeolites, polymer beads, microporous glass beads, carbon particulates, celluloses, polysaccharides, polymer films, polymer gels, and the like. Preferred particulate materials are chemically and mechanically stable, resist degradation from changes in pH, temperature, and pressure, and are rigid, although certain of these qualities may not be required in particular applications. Particulates which meet these requirements include silias, aluminas, and glass beads, with silicas being particularly preferred because of their low cost and high surface area which affords maximal loading of the carrier compounds of the present invention. Preferred sheet materials may be oxygen permeable or oxygen barriers depending on the desired application. Oxygen permeable polymers, such as silicone rubber, polybutadiene, SBR rubber, polyvinyl alcohols, polyamides (nylons), polysulfonamides, polyimides, polyurethanes, polyvinyl acetates, polyanhydrides, polyureas, polyacrylamide, cellophane, cellulose acetate, polyvinyl pyrrolidone, polyethylene oxide, and polydimethylsiloxane, are useful when it is desired to allow oxygen penetration and absorb or entrap the oxygen within or on the surface of the sheet material. Oxygen barrier polymers, such as polyethylene terephthalate (PET), polypropylene (PP), and polycarbonate (PC), are useful when it is desired to form packages or other structures which resist oxygen penetration. The carrier compounds of the present invention may be attached to the surface or incorporated within such polymers to scavenge any residual oxygen which may penetrate the barrier.

The carrier compounds or organic chelate will be adsorbed or covalently attached to the surface of the solid phase or will be immobilized or retained within the solid phase, e.g., the solid phase is a ligand-permeable barrier which physically entraps the carrier compound or the organic chelate. Alternatively, the solid phase of the invention may comprise a matrix formed by polymerization of at least one monomer in the presence of the carrier compound (or at least the multidentate organic chelate) under conditions such that the carrier compound is embedded in the resulting matrix. Such polymers may be prepared by free-radical, ionic or heterogeneous polymerization mechanisms. Examples of such polymers include derivatives of acrylamide, acrylic acid and methacrylate; water soluble polyurethanes, such as Hypol® (W. R. Grace); vinyl polymers; and polymers containing electrophilic functional groups, such as Surlyn®(Dupont).

The particular carrier compound and solid phase chosen for use in the present invention will be dependent on such factors as the ligand to be bound, the characteristics of the ligand-containing environment and the conditions of use contemplated. The carrier compound must have a high equilibrium constant for binding a small ligand under the particular conditions of its use. The particular carrier compound chosen and the appropriate ratio of carrier compound to solid phase are dependent on a variety of factors, such as changes in the mechanical properties of the solid phase, maximal oxygen scavenging capacity, oxygen affinity, stability of the isolated carrier compounds, and rates of oxygen removal from a contained space.

Covalent surface attachment will generally be the preferred type of immobilization when the loss of carrier compound from the composition is undesirable. Covalent surface attachment will also generally be employed with inorganic solid phase materials, such as silica and alumina particulates as well as glass beads. Numerous suitable protocols for covalent attachment of various molecules to such inorganic materials, as well as other materials, are described in the patent and scientific literature.

An exemplary covalent attachment protocol involving cyanogen bromide modification of available silanol groups on silica particulates is as follows:

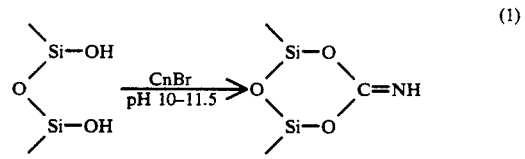

(1)

The resulting amidocarbonate group can then be reacted with a primary amino group available on the carrier compound of interest. Such reaction for a pentadentate polyalkylamine carrier compound is as follows:

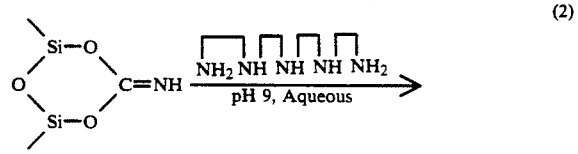

(2)

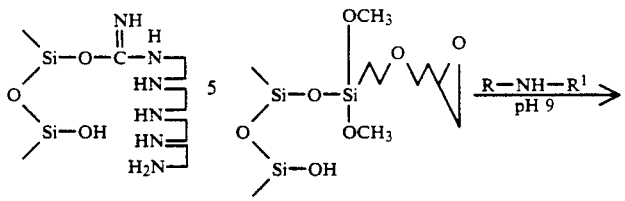

The pentadentate polyalkylamine compound reacts at one of the carbon oxygen bonds to provide the attaching linkage illustrated. This covalent attachment protocol can provide very high loading densities, typically up to about 30 moles of carrier compound per gram of silica. This protocol is described in detail in Example V, hereinafter.

An alternate protocol for covalent attachment utilizes a heterobifunctional organosilane to introduce an epoxide coupling group onto the silica substrate. Useful organosilane coupling agents include glycidoxypropyl-trimethoxysilanes, particularly 3-glycidoxypropyl-trimethoxysilane (GOPTMS), and chloropropyltrime-thoxysilanes. An exemplary covalent attachment protocol employing GOPTMS relies on reacting the GOPTMS with silica in an organic medium at room temperature, as follows:

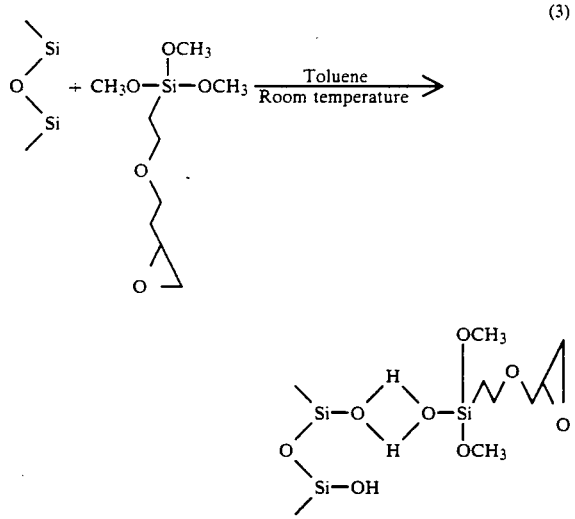

The intermediate product above is cured at an elevated temperature, typically about 100° C., to obtain the attachment group as follows:

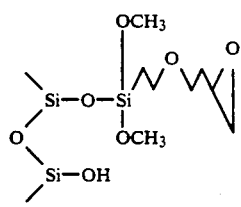

The resulting epoxide ring can couple to primary or secondary amines on a desired polyalkylamine carrier compound as follows:

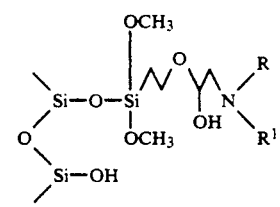

Incorporation of the carrier compounds of the present invention into rigid or flexible polymeric sheet materials can be accomplished by a variety of techniques. For example, the carrier compounds may be combined with a desired plastic resin and the mixture coextruded to form a single-layer (monolithic) sheet or film by conventional manufacturing techniques. Alternatively, the carrier compounds may be combined with a desired plastic resin and the combination of resin and carrier compounds coextruded or coinjected with another plastic resin material to form a multiple layer sheet or film. The layer containing the carrier compounds may be located on one side of the structure or may be sandwiched between plastic layers which are substantially free from the carrier compounds. It would also be possible to combine the carrier compounds in two or more of the layers which are coextruded. Finally, the carrier compounds may be combined in a coating material that is applied to the plastic sheet or film after the sheet or film has been fabricated.

Monolithic polymeric sheets, films, and other structures, may be formed by conventional plastic manufacturing techniques, typically extrusion and injection molding. The carrier compounds should be selected to withstand the conditions of extrustion and/or injection, typically elevated temperatures in the range from about 200° to 300° C. The carrier compounds may be activated at the time of incorporation (i.e., may be in an active form with complexed transition metal ion) or may be inactivated (free from complexed transition metal ion). In the latter case, the transition metal ion can be later introduced in order to provide active carrier compounds, as described in more detail hereinafter.

The multilayer polymeric structures of the present invention may similarly be formed by coextrusion or coinjection of the different desired material layers. Such coextrusion and coinjection methodologies are well known in the art and utilized, for example, to combine ethylvinyl alcohol or polyvinylidene chloride (Saran) with polypropylene layers in conventional polymeric packaging materials. The carrier compounds of the present invention could be employed in one or more of the multiple layers produced. In some cases, it might be desirable to provide individual layers which are oxygen permeable and other layers which are oxygen barriers. By then incorporating the carrier compounds in the oxygen permeable layers, the oxygen permeable layers connect as oxygen absorbent layers which scavenge oxygen which is able to penetrate the oxygen barrier layer(s).

Coating formulations incorporating the carrier compounds of the present invention may be provided for virtually any type of polymeric sheet material, or other material. Suitable solvents will be selected, depending on the particular solid phase of the carrier compound, and the solvents applied to the polymeric sheet materials by conventional methods.

The amount of the transition metal ion required for complexation with the multidentate organic chelate can be ascertained by measuring the oxygen-binding capacity of the resulting carrier compound. A sealed vessel of liquid, which is generally aqueous but which may also be an organic solvent such as methanol, ethanol or acetonitrile, which vessel contains a stir bar and an oxygen probe, is equilibrated with a test gas containing oxygen (or other ligand) at a defined concentration. An amount of the carrier compound isolated on a solid phase ("immobilized carrier compound") is added to the vessel sufficient to remove all of the oxygen present, based on previous determination of the oxygen-binding capacity of the carrier compound. The metal ion of interest is then titrated by adding aliquots of a freshly prepared solution of the dichloride salt of the transition metal until no further decrease in the solution oxygen concentration is seen. The weight ratio of metal ion to organic chelate thus determined is then used to define the amounts of each to be used for any specific application.

In actual use, the total amount of oxygen absorbing capacity of the immobilized carrier compound has to be greater than the amount of oxygen which can reasonably be anticipated to be contained in the environment from which oxygen is to be extracted. Preferably, the amount of oxygen absorbing capacity will be chosen to be at least two times greater than that which can reasonably be anticipated to be contained in the environment from which oxygen is to be extracted. More preferably, the amount of oxygen-absorbing capacity will be at least three to 10 times greater. Oxygen absorbing capacity is used herein to mean the average number of molecules of oxygen absorbed per molecule of carrier compound at equilibrium times the number of molecules of carrier compound.

In turn the oxygen absorbing-capacity may be related to the equilibrium constant. For the exemplary reaction $$Co(II)L + O_2 = Co(II)LO_2$$

(where L = a chelate), the equilibrium constant ($K_{eq}$) is defined as

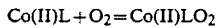

$$K_{eq} = [Co(II)LO_2] / [Co(II)L][O_2]$$

which will be dependent on such factors as the identity of L, the metal ion used, the ligand (here chosen to be $O_2$), and the conditions of intended use such as the nature and characteristics of the solid support and mode of attachment of the carrier complex thereto, and the nature and characteristics of the ligand-containing environment such as the phase (e.g., gas or liquid), the pH, the ionic strength, the composition of the ligand phase (e.g., predominant gases and solvents present), and the like. Generally, the carrier compound will be chosen such that, under the conditions of intended use, $K_{eq}$ will be greater than $10^5 \ M^{-1}$, preferably greater than $10^7 \ M^{-1}$, and more preferably greater than $10^9 \ M^{-1}$.

Methods for adsorbing, covalently attaching, or otherwise immobilizing the carrier compound (or organic chelate) onto a solid phase or embedding the carrier compound into a polymeric matrix will be dependent on the organic chelate used and on the particular application contemplated, as described above. Generally, the organic chelate is first immobilized or embedded in the solid support, after which the immobilized chelate is activated through contact with an aqueous solution of the transition metal ion typically in the form of a salt solution.

The compositions of the present invention may be used in a liquid slurry deoxygenation process, where the liquid to be deoxygenated is mixed with the immobilized chelate in the presence of the transition metal ion in a slurry tank for a period of time. The metal ion may be naturally present in the liquid or may be added to the liquid, either as the dry dichloride salt or as an aqueous solution, in the appropriate ratio at the appropriate concentration for the amount of dissolved oxygen present. Alternatively, the organic chelate and the metal ion may be preformed into the carrier compound prior to introduction to the liquid. After deoxygenation is complete, the immobilized chelate/metal complex and the bound oxygen are removed by filtration.

For cartridge deoxygenation applications, the immobilized chelate may be packed into a gas-tight cartridge or column. The activating transition metal (typically in the form of a dichloride salt) may then be layered as a dry powder onto the top of the dry packed deoxygenating cartridge. This type of cartridge is activated by the addition of water or other suitable polar solvent which dissolves the metal salt, allowing it to pass into and bind to the immobilized chelate. Alternatively, the column may be wet-slurry packed with the immobilized chelate, followed by a wash with a deoxygenated solution of the metal ion. Excess metal ion is then washed out with deoxygenated solvent, and the column is sealed and stored for later use.

For use as a dry additive contained in a membrane for addition to aqueous ligand-containing environments, an appropriate amount of the immobilized chelate and of dry metal ion salt are mixed together and packaged in a ligand-permeable membrane. Placement of the package in the aqueous solution to be deoxygenated will activate the composition for oxygen binding by causing the now dissolved metal ion to complex with the immobilized chelate.

The immobilized multidentate organic chelate may be mixed in aqueous or other polar solution with an appropriate amount of the transition metal ion under deoxygenated conditions. Once the complex is formed, the excess metal ion and the water are removed by rinsing in a water-miscible volatile solvent such as acetone or diethyl ether (deoxygenated). The complex is then dried under an inert atmosphere or vacuum, and sealed into ligand-impermeable packages for later use.

The solid phase is chosen to be substantially immiscible in the ligand-containing environment. Most commonly, the solid phase will be in the form of discrete particles to which the carrier compounds have been adsorbed or covalently attached. The particles may be exposed directly to the ligand-containing environment and easily separated based on the immiscible nature of the particles. Alternatively, the carrier compounds may be incorporated within a gas permeable membrane or sheet, where the membrane is exposed to the ligand-containing environment. Such membrane forms are particularly suitable for incorporation into physical structures, e.g., packages. Finally, the carrier compounds may be collected or retained within a barrier or region which is permeable to the ligand but substantially impermeable to the carrier compound. In this manner, the ligand is extracted from the environment in which it was originally contained without adding the carrier compound to the environment from which the ligand is extracted. Various combinations of these forms will also be possible. For example, the particulate composition of the present invention may be retained within a ligand-permeable structure to facilitate segregation and separation, while increasing capacity over a membrane-bound composition alone.

In one embodiment of the present invention, the carrier compounds are surrounded and enclosed by a membrane or other form of containment or article of packaging which is permeable to the ligand but impermeable to the carrier compound. The resulting structure is then placed into contact with the ligand-containing environment, whereby the ligand diffuses through the membrane or other containment and binds to the carrier compound. As discussed above, the carrier compound is optionally bound to a particulate to enhance isolation.

A suitable containment (or enclosed system) for the compositions of the present invention is disclosed in U.S. Pat. No. 4,093,105, the entire disclosure of which is incorporated herein by reference. Referring to FIGS. 9A and 9B, the container is generally designated as 10. Container 10 includes a one piece body 12 and a one piece cap 14, each of which is made entirely of plastic. The body 12 is substantially cup-shaped and has a cylindrical outer wall 16 and a flat bottom wall 18. The outer wall 16 of the body 12 has a recess 20 in its outer surface at the free end thereof. A rounded locking rib 22 projects radially outwardly from the bottom of the recess 20. The bottom wall 18 has three reinforcing ribs 24 extending thereacross with one of the reinforcing ribs extending diametrically across the bottom wall, and the other two reinforcing ribs extending in spaced parallel relation across and perpendicular to the one rib. In the areas of the bottom wall 18, between the reinforcing ribs 24 and the outer wall 16, are a plurality of small holes 26. Each of the holes 26 is in the shape of a truncated square pyramid. The area of the ends of the holes 26 at the interior surface of the bottom wall 18 is larger than the area of the ends of the holes at the exterior of the bottom wall.

The cap 14 includes a cylindrical outer wall 28 and a flat top wall 30. The outer diameter of the cap outer wall 28 is equal to the outer diameter of the body outer wall 16. The inner diameter of the cap outer wall 28 is equal to the diameter of the bottom surface of the recess 20 in the outer wall of the body. The length of the cap outer wall 28 is substantially equal to the length of the recess 20. The cap outer wall 28 has a rounded recess 32 around its inner surface. Thus, the cap outer wall 28 can fit around the free end portion of the body outer wall 16 with the outer surface of the cap outer wall 28 being flush with the outer surface of the body outer wall 16, and with the locking rib 22 snap fitting into the recess 32 to lock the cap 14 on the body 12. The top wall 30 of the cap 14 has a reinforcing rib 34 extending diametrically thereacross. A plurality of small holes 36 extend through the top wall 30 in the area between the reinforcing rib 34 and the outer wall 28. The holes 36, like the holes 26 in the bottom wall 18, are shaped as truncated, square pyramids having their smaller area ends at the outer surface of the top wall and their larger area ends at the inner surface. The holes 36 are of the same dimensions as the holes 26. The solid phase of the present invention is placed into the cavity 40 of the container 10.

In another embodiment of the present invention, the immobilized carrier compounds may be coated onto or otherwise attached to the interior surface of a container or a portion of a container. A desired product is then introduced into the container and the container sealed, whereby the carrier compound binds excess or residual oxygen or other ligand which may be present.

In a third embodiment, the ligand-absorbing composition comprises a carrier compound embedded in a polymeric matrix which is formed into a container into which a desired product is introduced. After sealing the package, residual ligand binds to the carrier compound. The container may comprise a single polymer layer but will more usually comprise more than one layer. In such multi-layer structures, the outer layer will be ligand-impermeable and the inner layer or layers will be permeable to the ligand.

In yet another embodiment, the carrier compound may be bound to a solid support in the form of a powder or other particulate matter. The particulate composition thus formed can be added directly to a ligand-containing environment such that it mixes with or passes through the ligand environment. The particulates may then be separated from the ligand-containing environment, conveniently by filtration, centrifugation, or other conventional separation process. Alternatively, the particulate composition may be packed into a bed or a column and the ligand-containing environment passed through it.

In one aspect of the present invention, the isolated carrier compound may be used in processing or packaging to eliminate oxygen selectively from an environment. For example, it may selectively capture oxygen during the processing and storage of dry or liquid foods or beverages. It may also be placed into the food or beverage container as a separate packet, physically incorporated onto container closures, or blended into polymers that are used as packaging material. It may also be used during transport of perishable foods such as fruits or vegetables by being placed in a truck, a railway car or other shipping container with the perishables. Such elimination of oxygen from the food environment can prolong shelf life and maintain freshness and flavor naturally without the use of food additives.

In an exemplary embodiment, oxygen-absorbing structures according to the present invention may be formed which allow selective activation of an immobilized chelate based on exposure to water or other polar solvent. Such structures will generally employ membrane barriers which initially maintain the carrier compounds and transition metal ions in an uncombined state, typically with the transition metal in the form of a transition metal salt. Conveniently, the organic chelate and the transition metal salt will be combined in a dry form so that the chelate and the metal ion will be unable to form a complex until exposed to water or other suitable polar solvent. This may be accomplished by exposure of the dry chelate and salt to a wet ligand-containing environment, such as a water-containing food or other packaged product. Alternatively, the water or polar solvent may be present in the oxygen-absorbing structure but isolated from the chelate and salt, typically by microencapsulation of at least one of the water, the salt, and the chelate, preferably the water. Combination of the ion and the chelate may then be effected by physically rupturing the microencapsulation. By performing all package fabrication and filling operations in a dry environment, the oxygen absorbent will remain in its inactive state. Activation will occur either at the time of or after sealing of the package, preferably being after sealing as a result of exposure to water in the package.

Membranes suitable for use in such packaging structures will be gas permeable, but possess sufficient mechanical strength to contain the oxygen-absorbing compositions (either carrier compound alone or carrier compound immobilized on a solid phase) and optionally to form part of the packaging structure. Such membranes should have an oxygen permeability (or other ligand permeability) of at least about 0.0001 cc/cm$^2$/hr., more typically being at least about 0.001 cc/cm$^2$/hr, preferably being at least about 0.002 cc/cm$^2$/hr. Suitable membranes include numerous organic polymers which are oxygen-permeable, such as silicone rubber, as well as other materials, such as sintered metals, sintered glasses, etc., which are capable of retaining the compositions while allowing gas permeation.

In some cases, it may be desirable to utilize membranes which are capable of providing a selective barrer to oxygen and other ligand gases. With such membranes, premature ligand binding could be avoided even when the oxygen absorbent compositions are in an active state, i.e., with transition metal ion bound to the multidentate organic chelates. For example, certain membrane materials are good oxygen barriers when dry (i.e., below about 50% relative humidity at 25° C.) but are oxygen permeable when wet (i.e., above about 90% relative humidity at 25° C.). Such membranes include polyvinyl alcohols, cellulose, cellulose acetate, polyvinyl acetate, and ethyl cellulose. Such membranes will be suitable for moisture-dependent activation as well as they become both water and gas permeable when wet.

Alternatively, it may sometimes be desirable to utilize membranes which are moisture permeable only when heated. Such membranes would allow package fabrication and filling operations to be performed in moist environments without premature activation of an absorbent held behind the membrane. Such membranes, however, will generally only be useful with products which are not degraded at the temperatures required for activation of the absorbent materials.

It will frequently be desirable to incorporate the membrane structures of the present invention in a package closure element. In this way, the oxygen absorbent material may be activated immediately prior to package sealing (or after package sealing) allowing maximum oxygen absorption capacity. By incorporating the oxygen absorbing materials in the package closure, the remaining portion of the package can be filled with product without regard to premature consumption of or activation of the absorbent material. Such closure structures will be particularly useful when employing moisture activated absorbents where a packaged liquid will be available to activate the absorbent after the package is closed. In this way, activation will not occur until after sealing.

An alternative absorbent structure may be formed by encapsulating the transition metal salts of the present invention (or aqueous solutions of such salts) and combining the encapsulated salts with the multidentate organic chelates. The resulting absorbents may then be activated by mechanically rupturing the capsules to release the salts and allow combination of the transition metals with the chelates. Conveniently, the transition metal salts will be in solution within the capsules so that the necessary moisture to allow complexation will also be provided, although the necessary moisture may be otherwise introduced.

In a particular embodiment of the present invention, immobilized carrier compounds may be incorporated within a package closure, such as a bottle cap, by covalent attachment, adsorption, or physical entrapment. Usually, the immobilized chelates will be incorporated separately from the transition metal salts to allow for subsequent activation by the mechanisms discussed above. Preformed complexes, however, may also be employed so long as sufficient precautions are taken to avoid premature oxygen binding.

Referring to FIGS. 1-3, specific bottle closure structures according to the present invention are illustrated. In FIG. 1, carrier compounds are incorporated within a polymeric bottle cap liner 110 which may then be inserted into bottle caps 112 by conventional techniques. The bottle cap liner 110 may simply be formed from a polymeric material in which the carrier compounds (more usually the multidentate chelates separated from the transition metal ions by any of the methods described above) have been incorporated by the methods described above. Alternatively, the carrier compounds or chelates may be introduced to a suitable liner material by spraying, plasma impinging, powder coating, or similar techniques, either immediately before or immediately after insertion of the liner 110 into the bottle cap 112. In any event, it will frequently be desirable to foam the bottle cap liner 110 after insertion by conventional techniques. Such foaming increases the surface area available for oxygen absorption.

Other techniques for forming the bottle cap liners 110 include extrusion of the polymeric material into a layer, where the carrier compounds (or organic chelate precursors) are combined with the polymeric resin prior to extrusion. Alternatively, the bottle cap liner 110 may comprise two or more layers, where not all layers comprise the carrier compounds.

To form structures in which the oxygen absorbent may be activated by moisture or mechanical disruption of microencapsulated transition metal ion, the transition metal ion will usually be coated on the face of the liner 110 which will be disposed against the interior surface of the bottle cap 112. Moisture will be able to penetrate the liner 110 in order to dissolve the transition metal salts and allow complexation. In the case of microencapsulated salts, the necessary rupturing can be provided by the mechanical process of inserting the cap liners. In any event, by limiting the amount of transition metal salt which is available, leaching of the salt from the bottle cap structure can be minimized or avoided entirely.

Referring now to FIG. 2, a bottle cap liner 114 may be constructed in the form of a pouch containing the carrier compound 116 of the present invention therein. The carrier compound 116 may be immobilized on a solid phase support, typically a particulate support such as silica, or may be unattached, relying on the pouch structure for containment. The carrier compound 116 may be in the active form, i.e., where the organic chelate is complexed with the transition metal ion, or may be inactive where the transition metal ion is separate but available for complexation. The pouch structure of membrane 114 is particularly suitable for containing a dry powder mix of chelate and transition metal ion salt, where the chelate may be activated by exposure of the mixture to moisture. The moisture will conveniently be available from liquid bottle contents.

The bottle cap liner 114 includes a backing layer 118 and a covering layer 120, where the layers 118 and 20 may be formed from the same or different materials. The covering layer 120 may be formed from any of the gas permeable polymers discussed hereinabove. The backing layer 118 may be formed from any of these polymers, as well as a variety of other substances which may be sealed or otherwise attached to the covering layer 120 and which may be further attached to the bottle cap 112. The covering layer 120 will typically be thin, having a thickness on the order of 0.001 inch, which will allow residual oxygen and a bottle head space to penetrate into the carrier compound 116 over a period of days. The liners 114 may be made by conventional techniques, such as the filling of a double film structure, where the individual liners 114 may be maintained on a tape until transfer to the bottle caps 112.

Referring now to FIG. 3, a bottle cap liner 122 is similar to liner 116, except that the carrier compound within the liner is in the form of a solid pellet 124. The carrier compounds, either in the active form or in the inactive form comprising a mixture of chelate and transition metal salt, may be pelletized by conventional techniques using suitable binding agents, such as sodium alginate, agar, carboxymethylcellulose, hydroxymethylcellulose, ethoxycellulose, propyloxycellulose, starch, polyvinylalcohols, saccharides, gums, and the like. The resulting pellets may then be inserted into the interior of cap liners 122 by conventional techniques. Alternatively, cap liners 122 may be formed over the pellets 124 by conventional techniques.

The bottle caps 112 illustrated in FIGS. 1-3 are shown as crown caps which are attached by pressure and compression to seal the periphery of the cap about the open end of a bottle, such as beer bottle. The present invention may be suitable for virtually any other type of bottle cap closure, including threaded bottle caps, which may be twisted off a bottle and later twisted back onto the bottle. In any event, the bottle caps will be sealed to the bottles by conventional techniques, with the only variations being required to avoid premature activation of the carrier compounds. In the case of active carrier compounds, this requires that the bottle caps be maintained in a substantially oxygen-free environment.

In the case of carrier compounds where the metal ion is sequestered from the chelate, the conditions of activation must be avoided prior to completion of package. For moisture-activated compositions, the bottle caps must be kept in a substantially dry environment, typically below about 50% relative humidity, preferably below about 30% relative humidity. In the case of pressure activated compositions, i.e., where the transition metal salt is microencapsulated, mechanical rupture of the microcapsules must be avoided.

The methods and structures of the present invention are particularly useful for bottling and canning beer. Beer is highly susceptible to oxygen degradation and, despite rigorous measures taken to exclude oxygen from the beer container, the beer shelf life is typically no longer than several months. The bottle caps of the present invention will be useful to increase the shelf life of beer to beyond six months, preferably beyond one year and longer.

Residual oxygen levels in a beer container after bottling or canning will be reduced to below about 100 ppb, preferably to below about 50 ppb, and more preferably to below about 25 ppb. The carrier compounds immobilized within the bottle caps will be able to function within the pH 4.0-4.5 range characteristic of beer, and further will be stable at the elevated temperatures of pasteurization. The carrier compounds will retain oxygen once it is bound and will be substantially free from leaching from the cap.

By way of further illustration, the use of the present invention in the production and packaging of wines is discussed. Because oxygen will react with the phenols in wine to produce by-products that can significantly affect color, taste, aroma and body, oxidation is an important aspect of wine production and packaging. Oxygen may be exposed to the wine ingredients at several points in the wine-making process, including the crush, fermentation, winery storage, and movement of the wine, e.g. from tank to tank or during bottling. Currently several common oxygen-controlling techniques are employed by the wine industry but each has important drawbacks.

Gas sparging involves the use of inert gases such as nitrogen to reduce oxygen. This is effective for blanketing headspace in storage tanks because the gas can move in to replace the oxygen. It is more difficult to achieve with reducing dissolved oxygen in the wine, however, and requires multiple flushings to achieve low ppm levels. This, in turn, makes the technique very expensive to perform and complex in terms of equipment and manifolding. Additionally, the gas not only displaces oxygen but also other volatiles that may provide important flavor and aroma to the wine industry. The same drawbacks hold true for vacuum packing techniques.

Sulfur dioxide ($SO_2$) is a common additive in almost all wines and serves several purposes in addition to oxygen scavenging, including microbial protection. One of the problems with the use of $SO_2$ is that a portion of the population is allergic to it, so that products containing greater than 10 ppm of $SO_2$ must be labelled; after initial oxidation, there is usually about 25-30 ppm of $SO_2$ in wine.

Ascorbic acid will react quickly with oxygen and therefore is a common anti-oxidant additive. However, it can only be used in limited quantities before affecting the end product.

The methods and products of the present invention present a solution to the above problems, and may do so by several different applications. As a powder, the solid phase of the invention may be added as a slurry and later removed during processing of the liquid to eliminate the oxygen prior to packaging. As a recirculating fluid, the solid phase may be used with a membrane system to remove oxygen continuously during processing. This could work to remove oxygen from the liquid directly or to lower the oxygen concentration in a gas stream, such as in the headspace of the crusher or fermenter. For elimination of oxygen in the bottle, the solid phase may be coated onto the inside of the bottle or of a closure of the bottle, with a membrane separator if necessary. Alternatively, the solid phase itself may be shaped into a package or container which will allow elimination of the internal oxygen while creating a barrier to external oxygen penetration.

As in wine production and storage, as described above, it is contemplated to use the methods and products of the present invention in the beer industry. In this context, the present invention is particularly useful as a slurry which may be added, for example, during the step which is currently used to chill-proof the beer by removing part of the dissolved protein by adsorption to silica.

Additionally, the present invention can be used with any number of other foods and beverages, particularly those with a short storage life due to oxidation. These would include, but are not limited to, such products as potato chips and other fried foods; fruit juices such as orange juice; meats; vegetables and fruits; and baked goods such as breads, crackers and cookies.

The following examples are presented to illustrate the present invention without limiting same.

EXPERIMENTAL

EXAMPLE I 1,11-Bis(2-pyridyl)-2,6,10-triazaundecane · 3HCl

Pyridine-2-carboxaldehyde (4.3 g, 0.04 mole) and 1,5,9-triazanonane (2.6 g, 0.02 mole) [bis(aminopropyl)amine; available from Aldrich Chemical Company] were dissolved in ca. 60 ml of absolute ethanol and warmed (ca. 50° C.) with stirring for 10 minutes. The solution was hydrogenated at room temperature over 1.5 g of 5% Pd on charcoal in an atmosphere of hydrogen. After the calculated amount of hydrogen (0.04 mole; ca. 0.90 1 at 25° C. and 1 atm. pressure) had been consumed, the charcoal catalyst was removed by filtration, and dry HCl gas was bubbled into the solution until no further white precipitate formed. After removing the precipitate by filtration of the cooled solution, the product was washed with absolute ethanol, dried, and recrystallized from 95% ethanol.

The product was then dissolved in a minimum amount of a solution of about 70% v/v methanol and about 30% v/v concentrated ammonium hydroxide. This solution was chromatographed on a column of silica gel F254 using the same solvent mixture. The eluate containing the product was partially evaporated under vacuum with heating (ca. 70°–80° C.), cooled, and filtered to remove the precipitated silica (dissolved from the column during chromatography), and then evaporated to dryness. The purified product was again recrystallized from 95% ethanol. The product could also be successfully purified by chromatography on silica gel using a solvent comprising about 66% chloroform, 5% triethylamine and 29% methanol.

The following characterization of the purified product by standard techniques was obtained: M.P. 263–265 C; UV (0.04 mg/ml in methanol): max 258.5 nm, max=5540; elemental analysis: theory 51.12% C, 7.17% H, 16.56% N, 25.25% Cl; found: 50.83% C, 7.06% H, 16.45% N, 24.97% Cl. Thin layer chromatography (TLC) analysis on silica gel F-254 with methanol-:ammonium hydroxide (10:3) solvent and UV/iodine detection yielded a single spot at Rf=0.6.

EXAMPLE II 1,9-Bis(2-pyridyl)-2,5,8-triazanonane · HCl

The preparation and purification of this polyalkylamine were accomplished by the procedure of Example I, substituting 1,4,7-triazaheptane [bis(aminoethyl)amine; available from Aldrich] for bis(aminopropyl)amine.

EXAMPLE III

Tetraethylenepentamine · 5HCl

Technical grade tetraethylenepentamine (1,4,7,10,13-pentaazatridecane; commercially available) was diluted at 1:1 in 100% ethanol, after which 5 moles of hydrochloric acid is added as the methanolic solution (2–4 M) per mole of tetraethylenepentamine. The HCl salt formed a milky white to pink globular mass. This precipitate was rinsed with ethanol and recrystallized from hot ethanol and water to yield tetraethylenepentamine pentahydrochloride.

EXAMPLE IV

Silica/tetraethylenepentamine complex

Chromatography-grade silica, 200–400 mesh, was acid-washed for 4 hours at room temperature in 5 N nitric acid, rinsed with distilled water until the wash was at pH 7, then dried at 100° C.

100 Grams of the acid-washed silica was added to 150–200 ml of 2 M potassium hydroxide in methanol and stirred for 5 minutes under vacuum. The methanolic KOH was filtered off on a Buchner funnel, and the silica was rinsed with a small amount of methanol. The silica was added to 5.3 g of cyanogen bromide in 20 ml of acetonitrile on an ice bath with stirring, over a period of 2 minutes. The mixture was allowed to stir for a total of 5 minutes, after which time the excess CNBr/acetonitrile was filtered off on a Buchner funnel. The silica was rinsed quickly with acetonitrile, then added to a flask containing 20 mmoles of tetraethylenepentamine HCl in water at pH 9.0. The mixture was incubated overnight on a shaker at room temperature, after which excess tetraethylenepentamine was removed by filtration on extensive rinsing with 1 mM sodium hydroxide, followed by water, until tetraethylenepentamine was no longer detected in the eluted wash fractions to give tetraethylenepentamine immobilized on silica ("silica/tetren").

EXAMPLE V

Silica/1,9-bis(2 pyridyl)-2,5,8-triazanonane complex

Following the procedure of Example IV, except that the coupling pH was 7 rather than 9, acid-washed silica is reacted with cyanogen bromide and then with 1,9-bis(2-pyridyl)-2,5,8-triazanonane.HCl to give 1,9-bis(2-pyridyl)-2,5,8-triazadecane immobilized on silica ("silica/pydien").

EXAMPLE VI

Argon-saturated water was passed through a 30 g wet-packed column of silica/tetren to remove oxygen. Argon-saturated cobaltous chloride was loaded onto the column until cobalt was seen to break through the eluent. The column was then washed with argon-saturated water until cobalt disappears (ca. 10 column volumes). Aerated water was flowed through the activated column and measurements were taken to determine the oxygen concentration of the resulting water (with a YSI #5331 Clark-type potentiometric oxygen probe). FIG. 4 shows that the silica-immobilized $Co^{++}$/tetraethylenepentamine complex was effective in removing oxygen to levels at or below 100 ppb, until ca. 2.4 liters of water had passed through the column, at which point the maximum oxygen-binding capacity of the column was reached.

EXAMPLE VII

To a 440 ml container of water equilibrated with oxygen at ca. 450 ppb, which is approximately the concentration found in beer at bottling, was added 200 mg of silica/tetren, with stirring. Either ferrous chloride or cobaltous chloride was then added at 30 micromoles (ca. 5X the amount necessary to deoxygenate), with continued stirring. After approximately 60 minutes, the water was filtered off and tested for concentration of oxygen (with a Clark-type potentiometric oxygen probe). FIG. 5 shows that while the rate of deoxygenation and the amount of oxygen removed with ferrous chloride is decreased relative to cobaltous chloride, the oxygen concentration with both metal ions was reduced to below 100 ppb.

EXAMPLE VIII

15 Micromoles of cobaltous chloride were added to 500 ml of water equilibrated at ca. 400 ppb oxygen. Either silica/tetren or silica/pydien was titrated into the solution, with stirring, and readings of the oxygen concentration of the water were taken (using a Clark-type potentiometric oxygen probe) following each addition. FIG. 6 indicates that as the amount of the silica/chelate complex increased, the amount of deoxygenation of the water increased, with the silica/tetren (FIG. 6A) achieving a faster and greater oxygen removal than the silica/pydien (FIG. 6B).

EXAMPLE IX

Polyacrylic acid]/1,11-bis(2-pyridyl)-2,6,10-triazaundecane complex

To 20 ml of dionized water were added 0.2 g of poly[acrylic acid] (MW=4,000,000) and 0.85 g of 1,11-bis(2-pyridyl)-2,6,10-triazaundecane; ratio ca. 1:1. The mixture was stirred and heated to ca. 50° C. To this was added 5 ml of heated potassium persulfate solution, prepared from 1 g of $K_2S_2O_8$ in 20 ml of dionized water, at 50° C. The solution was stirred for 10 minutes.

A few ml of the above solution were pipetted onto the side of a quartz cuvette. A piece of parafilm was layed across the solution to form a thin film, which was then dried in an oven at 40° C. for a few hours. The parafilm was removed and drying continued to give a gel.

EXAMPLE X

A teflon spacer was attached to the edge of a quartz microscope slide. A small piece (less than 0.5 cm$^2$) of the gel from Example IX was placed on the prepared slide, which was then rinsed several times with deionized water. A few milliliters of deoxygenated $CoCl_2$ (150 mg/15 ml) were added to the gel, and a second quartz slide was rapidly fixed over the gel. The slides were clamped together and placed in a cell holder, and the oxygen uptake was measured. $CoCl_2$ in aqueous solution does not bind oxygen. However, when the $Co^{++}$ becomes bound to the polymer gel, it becomes activated and then will bind oxygen. FIG. 7 indicates that oxygen was not being absorbed at time 0, when the $CoCl_2$ was first added to the gel (FIG. 7A), but that over the following 180 minutes (FIGS. 7B-7D), oxygen was being taken up (peak at 450 nm).

EXAMPLE XI

Polyacrylamide/tetraethylenepentamine complex

To prepare a gel of 5% final acrylamide w/v concentration, acrylamide (1.46 g in 2.5 ml of water with 0.8% (w/v) of bis-acrylamide) was added to 3 ml of water, 7.5 ml of 0.4 M Tris buffer, 2 ml of 1% ammonium persulfate and 1 ml of 1% N,N,N',N'-tetramethylethylenediamine. After the slab of gel was cast, it was incubated with 5 ml of tetraethylenepentamine ("tetren") overnight at 90° C. and then rinsed extensively with water to remove non-bound tetren, to give tetraethylenepentamine embedded in a polyacrylamide gel ("polyacrylamide/tetren gel").

EXAMPLE XII

A wedge of the polyacrylamide/tetren gel from Example XI was placed against the side of a quartz cuvette and a spectra was taken (FIG. 8-1). A deaerated solution of $CoCl_2$ and argon was then introduced into the cuvette and a spectra was taken (FIG. 8-2; solution $CoCl_2$ is evident in the absorption band at 500 nm). The color of the gel became light brown. Excess cobalt solution was removed by washing under argon, after which an aerated solution of water was introduced into the cuvette. After soaking for 20 minutes, this solution was removed and a fresh aerated solution was added. The color of the gel had changed to dark brown. Spectra was taken after the second water rinse (FIG. 8-3), which indicated oxygen uptake by the immobilized $Co^{++}$/polyacrylamide/tetren complex (absorption band at 325 nm).

EXAMPLE XIII

A sealed 500 mL container containing a magnetic stir bar, ported to accept a polarographic oxygen probe, and equipped with a septum port for addition of test solutions was filled with 500 mL of distilled water. The container was equilibrated with a 1.2% oxygen/98.8% nitrogen gas mixture, with magnetic stirring of the solution. The oxygen probe was calibrated in aerated water immediately prior to use. Fifteen $\mu$moles of $CoCl_2$ in 15 $\mu$l was added to the solution. Subsequently, twelve aliquots of a slurry of 10 ml distilled water containing 2 grams of silica derivatized previously with 1,9-bis(2-pyridyl)-2,5,8-triazanonane, as described in Example V, were added to the container via the sampling port. The oxygen concentration in the solution was measured after each slurry addition after the changes in oxygen concentration stabilized, generally after about 10 minutes. The results are set forth in FIG. 10. The results demonstrate that the silica-chelate may be activated by complexation with cobalt ion in situ in the solution.

EXAMPLE XIV

Figure 11:
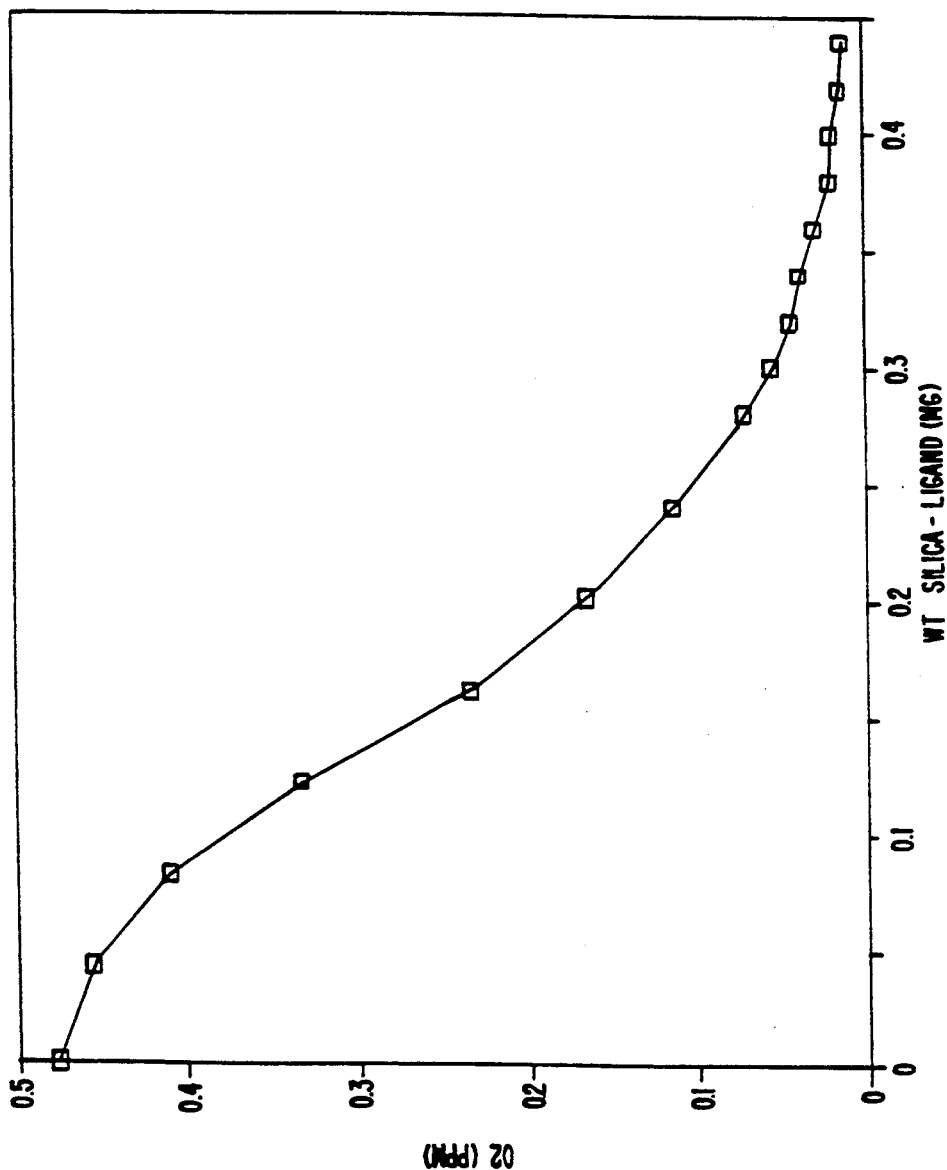
FIG. 11 is a graph illustrating oxygen absorption from water as a function of amount of a different silica-immobilized carrier compound than that utilized in FIG. 10.

The protocol of Example XIII was repeated, except that a freshly prepared 1M solution of $FeCl_2$ was used instead of 1M $CoCl_2$ and fifteen aliquots were added to the solution. The results are set forth in FIG. 11.

EXAMPLE XV

Figure 12:
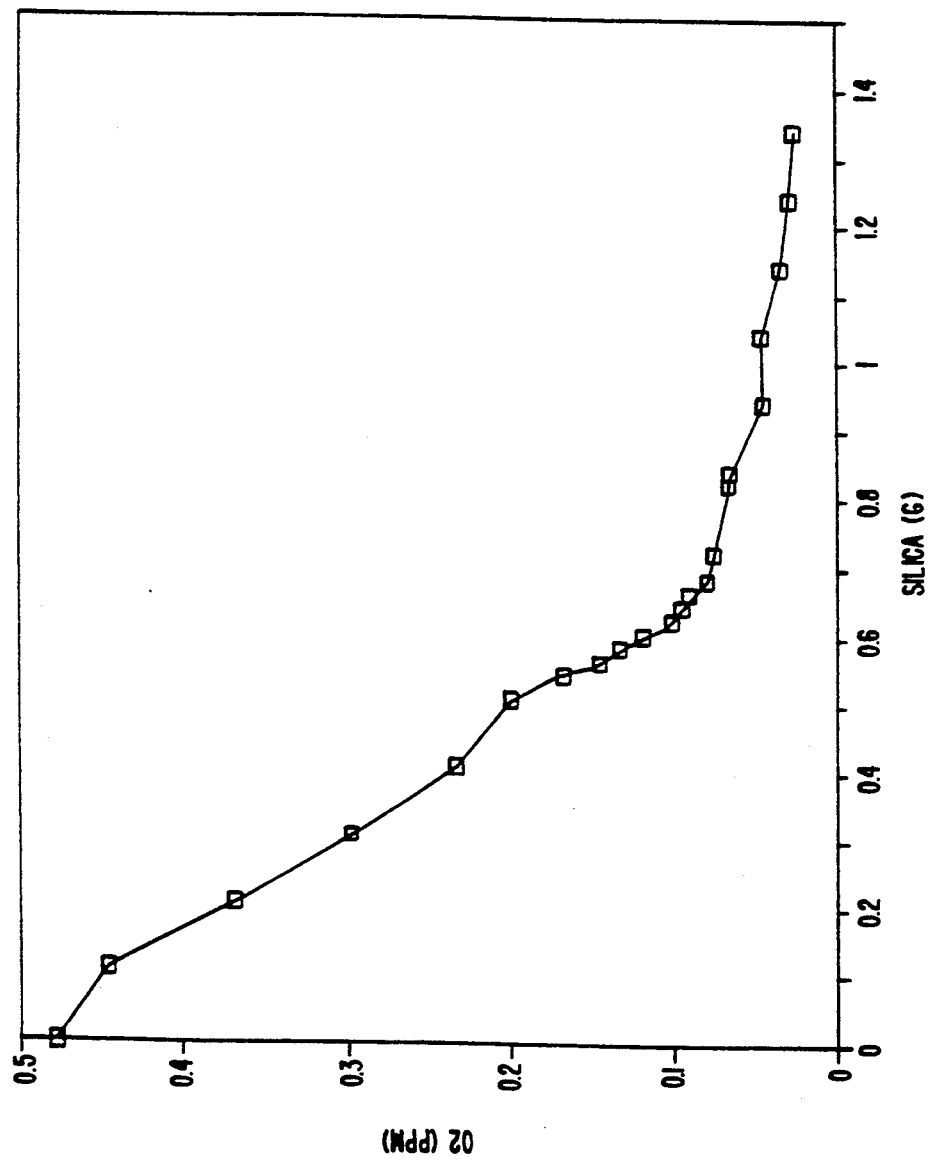
FIG. 12 is a graph illustrating oxygen absorption from an aqueous sodium acetate solution as a function of amount of silica-immobilized carrier compound.

The protocol of Example XIV was repeated, except that the test solution included 50 mM sodium acetate buffer at pH 4.5, mimicking the condition of acidic products such as beer. The results are set forth in FIG. 12.

EXAMPLE XVI

Figure 13:
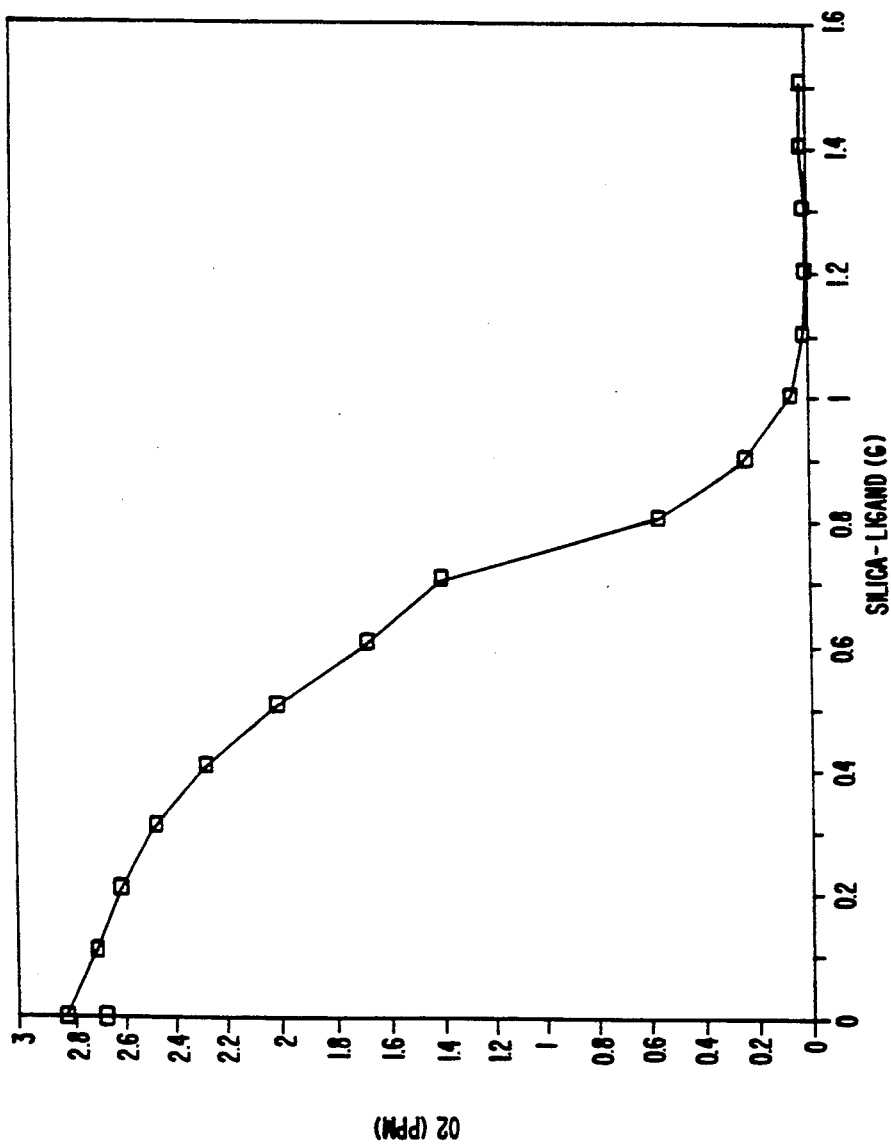
FIG. 13 is a graph illustrating oxygen absorption from beer as a function of amount of silica-immobilized carrier compound.

The protocol of Example XIV was again repeated, except that beer was substituted for the aqueous test solution. The results are set forth in FIG. 13.

EXAMPLE XVII

Twelve ounce beer bottles were cut off at the base and fitted into a PVC pipe fitting modified to accept the bottle. The joint was sealed with epoxy cement, and the PVC fitting was ported to accept either a polarographic oxygen probe or a septum sealed sampling port.

Prototype deoxygenating bottle caps were prepared by gluing 1 cc plastic desiccant capsules (of the type illustrated in FIG. 6) into the liner area of the bottle caps. The desiccant capsule lids have a screened opening which was covered with a microporous membrane to prevent the contents of the capsule from entering the test solution. The desiccant capsules were filled with 600 mg of silica containing 240 μmoles of 1,9-bis(2-pyridyl)-2,5,8-triazanonane prepared as described in Example V.

The mixture in the dry state was inactive towards oxygen binding as judged by the lack of color change associated with the mixture of the metal salt with the silica-ligand. When test batches of this mixture were subjected to 100% humidity for 24 hours, the mixture hydrated sufficiently to permit migration of the metal salt ion to the chelate, forming an active oxygen binding complex as judged by the formation of a deep brown-purple color.

Figure 14:
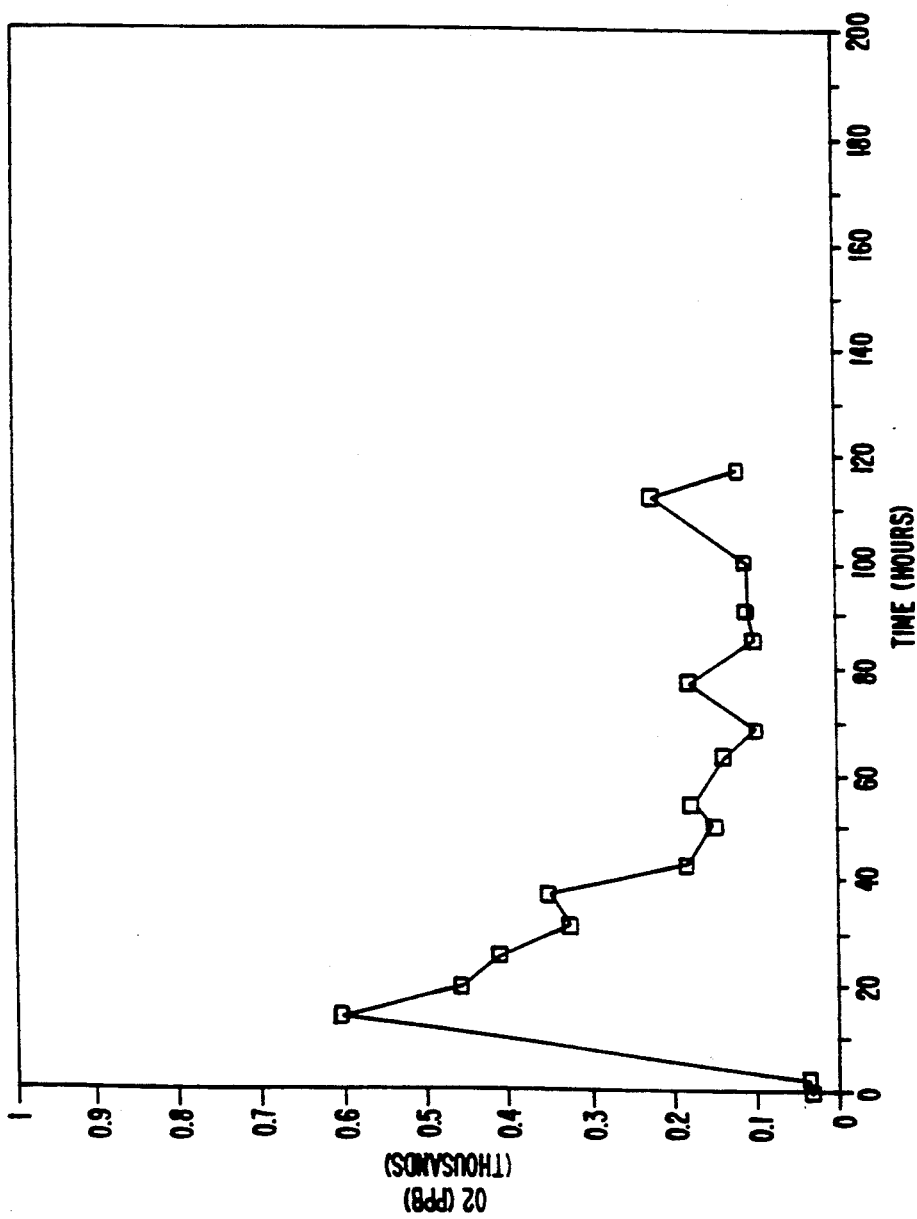
FIG. 14 is a graph illustrating oxygen absorption over time from a carbonated ethanol water solution using a bottle cap structure containing a silica-immobilized carrier compound.

Bottles containing 8% ethanol in water were equilibrated with a 1.2% oxygen/98.8% nitrogen gas mixture until a stable oxygen reading was recorded using a polarographic oxygen probe. The bottles were then capped with the prototype caps described above, with either chemical or gaseous carbon dioxide pressurization to 30 psi. Oxygen concentration in the bottle, expressed as ppb (μg/kg solution), was determined with either a polarographic oxygen probe ported into the modified bottle, or by a chemical assay using the redox dye Rhodazine TM (Hach Chemical Company). In the latter case, samples were removed via syringe needle through the septum-covered sampling port. The results are set forth in FIG. 14.

EXAMPLE XVIII

Figure 15:
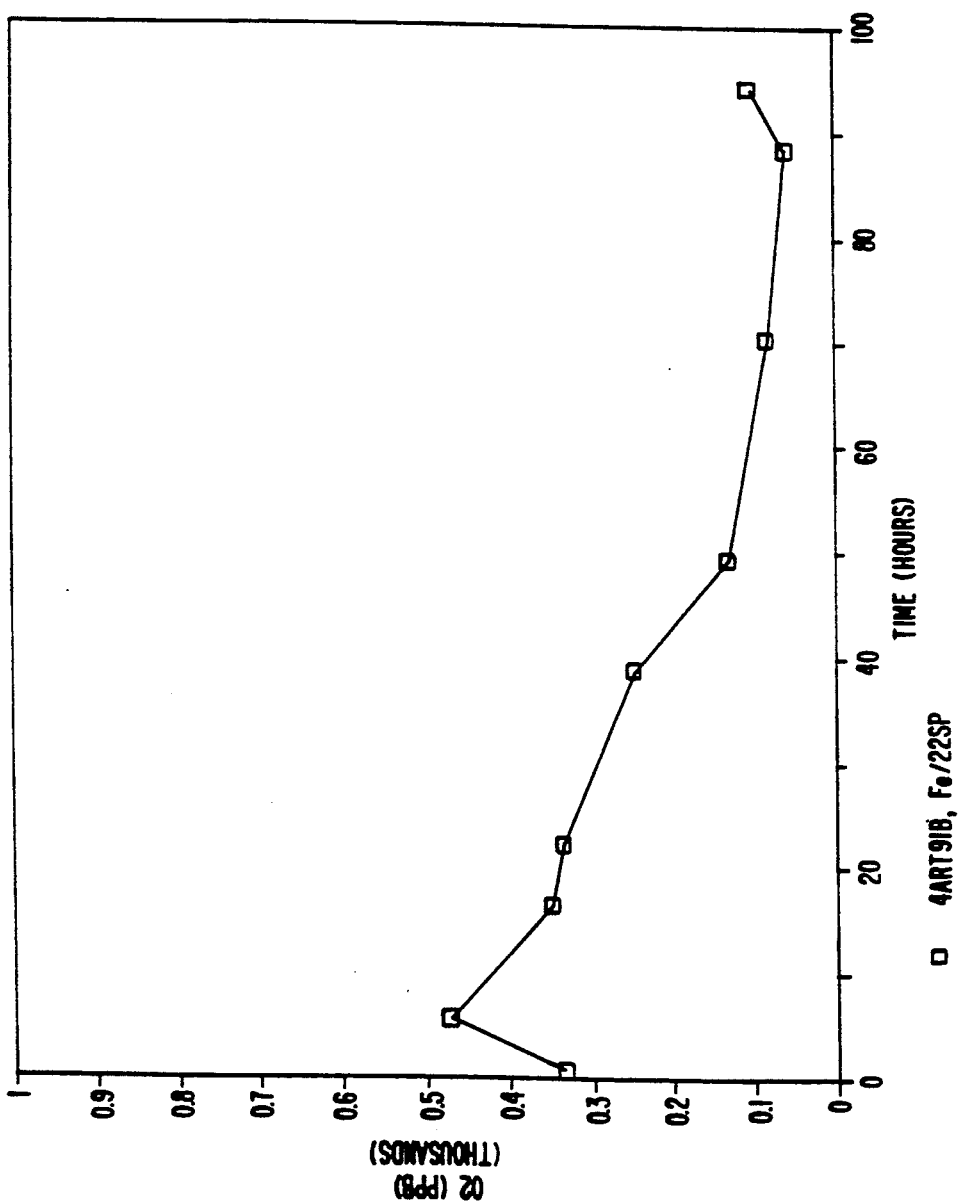
FIG. 15 is a graph illustrating oxygen absorption over time from a carbonated ethanol water solution using a bottle cap structure containing a different silica-immobilized carrier compound than that utilized in FIG. 14.

Bottles were prepared as in Example XVII except that FeCl$_2$ salt was substituted for the CoCl$_2$ salt in the desiccant capsules. A test solution of 8% ethanol in water equilibrated with a 1.2% oxygen/98.8% nitrogen gas mixture was added to the bottles, and oxygen concentration measured over time after sealing with the bottle caps. The results are set forth in FIG. 15.

From the foregoing, it will be appreciated that the composition, methods and devices of the present invention are useful for the extraction of a small ligand, such as oxygen, from a ligand-containing environment.

Although the present invention has been described in some detail by way of example for purposes of clarity and understanding, it will be apparent that other arrangements and equivalents are possible and may be employed without departing from the spirit and scope of the invention. Therefore, the description and illustrations should not be construed as limiting the scope of the invention, which is delineated by the appended claims.

What is claimed is:

1. A packaging system comprising:
   an enclosure having an interior;
   means for sealing the interior to substantially inhibit oxygen penetration;
   an oxygen-permeable membrane which defines a segregated volume within the interior; and
   an oxygen-absorbent material within the segregated volume, said oxygen-absorbent material including a multidentate chelate and a transition metal which complexes with the chelate to become an active oxygen-absorber having an equilibrium constant greater than $10^5$ M$^{-1}$ under conditions of use.

2. A packaging system as in claim 1, wherein the oxygen-permeable membrane is attached to the interior surface of the enclosure.

3. A packaging system as in claim 1, wherein the oxygen-permeable membrane is a self-contained packet disposed in the interior of the enclosure but not attached thereto.

4. A packaging system as in claim 1, wherein the oxygen-permeable membrane is attached to the means for sealing.

5. A packaging system as in claim 1, wherein the enclosure is a bottle and the means for sealing is a bottle cap, said membrane being secured to the interior of the bottle cap so that the membrane will be exposed to the interior of the bottle.

6. A packaging system as in claim 1, wherein the oxygen-permeable membrane is composed of a material selected from the group consisting of polyvinyl alcohols, polyamides (nylons), polysulfonamides, polyimides, polyurethanes, polyvinyl acetates, polyanhydrides, polyureas, polyacrylamide, cellophane, cellulose acetate, polyvinyl pyrrolidone, polyethylene oxide, and polydimethylsiloxane.

7. A packaging system as in claim 1, wherein the multidentate chelate includes one or more compounds selected from the group consisting of porphyrins and derivatives; linear and cyclic polyalkylamines; phthalocyanines and derivatives; crown ethers; macrocyclic amines and lacunates; acetylacetonates; Schiff bases; ammonia; primary, secondary and tertiary amines, amino acids and derivatives; diamines; and heterocyclic amines.

8. A packaging system as in claim 1, wherein the transition metal is selected from the group consisting of titanium, manganese, chromium, iron, cobalt, nickel, copper, ruthenium, rhodium, palladium, osmium, iridium, vanadium, and platinum.

9. A packaging system as in claim 1, wherein the multidentate chelate is immobilized on a particulate solid phase.

10. A packaging system as in claim 1, wherein the transition metal is sequestered from the chelate prior to exposure to moisture.

11. A packaging system as in claim 10, wherein the transition metal is in the form of a salt and the membrane is water permeable to allow water exposure to the salt to solubilize the salt and permit complex formation.

12. A packaging system as in claim 1, wherein the transition metal is complexed with the chelate.

* * * * *

UNITED STATES PATENT AND TRADEMARK OFFICE
CERTIFICATE OF CORRECTION

PATENT NO.   : 5,096,724
DATED        : March 17, 1992
INVENTOR(S)  : Bruce Zenner et al.

It is certified that error appears in the above-identified patent and that said Letters Patent is hereby corrected as shown below:

Title page, item

"[75]  Inventors:   Bruce Zenner, Hercules; Emory De Castro, Emeryville;" please cancel "Joseph P. Ciccone, Davis" and substitute therefor --Steven J. Carnevale, San Francisco--.

Signed and Sealed this

Twenty-fourth Day of August, 1993

Attest:

BRUCE LEHMAN

*Attesting Officer*     *Commissioner of Patents and Trademarks*